United States Patent [19]
McMichael et al.

[11] Patent Number: 5,177,387
[45] Date of Patent: Jan. 5, 1993

[54] HIGH TEMPERATURE SUPERCONDUCTING MAGNETIC BEARINGS

[75] Inventors: Chase K. McMichael, Houston; Wei-Kan Chu, Pearland, both of Tex.

[73] Assignee: University of Houston-University Park, Houston, Tex.

[21] Appl. No.: 625,988

[22] Filed: Dec. 4, 1990

[51] Int. Cl.$^5$ .................................................. H02K 7/09
[52] U.S. Cl. ......................................... 310/90.5; 310/90
[58] Field of Search .................. 310/90.5, 46, 90, 114; 308/10; 384/9, 126, 416

[56] References Cited

U.S. PATENT DOCUMENTS

| | | | |
|---|---|---|---|
| 3,005,117 | 10/1961 | Buchhold | 505/878 |
| 3,026,151 | 3/1962 | Buchhold | 505/878 |
| 3,378,315 | 4/1968 | Saver | 505/877 |
| 3,779,618 | 12/1973 | Soglia et al. | 308/10 |
| 3,890,019 | 6/1975 | Boden et al. | 308/10 |
| 4,563,046 | 1/1986 | Shimamoto | 308/10 |
| 4,797,386 | 1/1989 | Gyorgy et al. | 310/90.5 |
| 4,843,504 | 6/1989 | Barnes | 306/106 |
| 4,886,778 | 12/1989 | Moon et al. | 310/90.5 |
| 4,926,082 | 5/1990 | Barnes | 310/90.5 |
| 4,939,120 | 7/1990 | Moon et al. | 310/90.5 |

FOREIGN PATENT DOCUMENTS 875121  10/1981  U.S.S.R. .............................. 310/90.5

Primary Examiner—Steven L. Stephan
Attorney, Agent, or Firm—Pravel, Gambrell, Hewitt, Kimball & Krieger

[57] ABSTRACT

A magnetic bearing having a rotatable member and a stationary member on one of which is mounted a superconductor while on the other is mounted a set of permanent magnets or electromagnets arranged as a quadrupole or multiple dipoles. The magnetic member, which is in the form of a dipole, a quadrupole, or other multiple dipole, such as an octopole, is positioned to enable the magnetic fields generated by the permanent magnets to interact with the superconducting material and to confine the shaft in all directions in the desired location. The bearing systems can be used as either a thrust bearing or as a journal bearing, or as both. Each dipole may be twinned to reduce magnetic field asymmetry and reduce energy dissipation upon rotation. The superconductor may be laminated, and/or additional magnets may be located outside the superconductor in order to increase the bearing stiffness and rigidity.

56 Claims, 19 Drawing Sheets

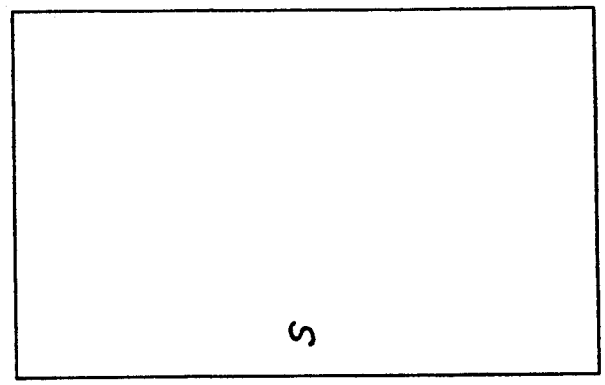
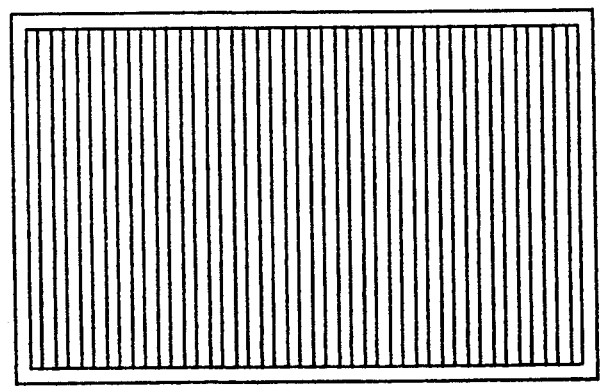
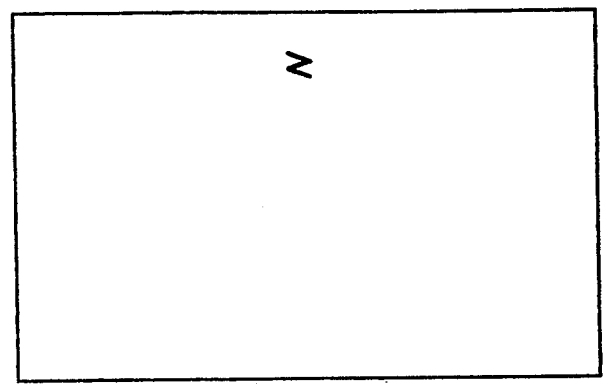
FIG. 16

HIGH TEMPERATURE SUPERCONDUCTING MAGNETIC BEARINGS

The invention of this invention was made and conceived at least in part with United States Government support and the United States Government has certain rights in the invention.

BACKGROUND OF THE INVENTION

1. Field of the Invention

This invention relates to novel suspended magnetic bearings and more particularly, to bearings which take advantage of the interaction of permanent magnets with high temperature superconducting material.

2. Description of the Prior Art

Conventional mechanical bearings used in conjunction with high rotational speed devices are subject to metal wear, noise, vibration and friction heating problems. These problems can often lead to seizure or other failure of the bearing. In addition, mechanical bearings often require lubricants which fail in severe environments such as those commonly encountered in outer space. Failure of conventional liquid lubricants in outer space is due to the vacuum conditions that cause the lubricants to outgas, leaving bearing surfaces dry and resulting in the ultimate failure of the bearings.

As a result of these and other shortcomings, there has been considerable emphasis on the development of alternatives to mechanical bearings. For example, work has been done to develop more efficient air bearings as well as magnetically suspended bearings.

One problem with air bearings is that they require a completely pneumatic system, including pumps, valves, seals, and conduits, for their operation. Another shortcoming of air bearings is that they result in a continuous energy loss. For example, a high speed cryo-cooler system in outer space applications, would suffer a 10–20 watt energy loss due to bearing friction losses. Even in non-space applications, use of an air system adds significant cost, size, and weight to the bearing package and introduces various reliability problems normally associated with pneumatic system components.

Air bearings themselves are difficult to manufacture, and thus expensive, because of the fine tolerances required, which are on the order of one ten-thousandth of an inch. Furthermore, air bearings are highly vulnerable to contaminants. A particle of dust as small as four ten-thousandths of an inch can interfere with air gaps and clog pores of graphite or other diffusive coating.

Magnetically suspended bearings have been developed. They are generally unstable and require for their operability control means, such as rapidly acting feedback control systems, to compensate for displacements from the set point. Until recently, magnetic bearings have been of one of two types—either permanent magnets or electromagnets.

The use of permanent magnets is limited to applications where very small forces are adequate. Electromagnets, which can supply considerably more magnetic force than comparable permanent magnets, are much more convenient to use and are thus preferred for use in conjunction with feedback control systems. However, the use of electromagnets adds considerably to the cost, size, and operational complexity of the system.

It has been appreciated for years that magnetic fields strongly interact with superconducting materials. Recent research activities have brought the discovery of "high temperature superconducting" (HTS) compounds. HTS compounds are those which superconduct at and below a critical temperature, $T_c$, which is above the boiling point temperature of nitrogen.

Since they superconduct at temperatures greater than 77° K., the new CuO high temperature superconductors may be cooled with liquid nitrogen, which is a far less costly refrigerant than helium. As a result, the rather complex thermal insulation and helium-recycling systems, necessary to avoid wasting the expensive helium coolant required for the low temperature superconducting material previously known, is no longer necessary. The YBaCuO HTS compounds simplify and enhance the reliability of commercial applications of superconductors. Liquid nitrogen is about 2000 times more efficient to use in terms of cost, when both the refrigerant itself and the associated refrigerant unit design are considered.

Magnetic fields were disclosed for use as bearings in U.S. Pat. No. 3,810,683. Use of superconductors for support bearings was taught in U.S. Pat. No. 3,378,315, wherein superconducting material is used for a spindle bearing with either permanent magnets or electromagnets providing the supporting magnetic field. U.S. Pat. No. 3,026,151 shows superconductor bearings with the actuator coils likewise formed of superconducting materials.

The recent advances in superconducting materials and the parallel advancements in the field of permanent magnets have made it possible to economically and efficiently couple a superconducting member with a magnetic member to produce highly efficient and relatively inexpensive bearings.

Superconductive materials are of two basic types, designated as Type I and Type II. Efforts have been made in the past to improve magnetic bearing technology by maintaining either the bearing member or the rotating member, or both, in a Type I superconducting state to achieve sufficient magnetic pressure to provide the desired degree of levitation. Unlike Type II superconductors, Type I superconductors are incapable of effecting suspension.

Type I superconductors feature perfect diamagnetism up to a critical applied field, at which point superconductivity is lost and the magnetization of the sample rises abruptly. Examples of superconducting bearings of Type I materials can be found in U.S. Pat. Nos. 3,493,274 and 3,026,151. In order to achieve stability in these systems, the bearing structures must rely on either a mechanical rotary support or must employ superconductors shaped to provide a laterally stable configuration.

The recent discoveries of high temperature superconductors involve Type II materials. Whereas a Type I superconductor completely blocks out magnetic flux from its interior, a phenomenon known as diamagnetism, Type II superconductors allow a certain amount of magnetic flux to penetrate into the interior of the material, producing a suspension effect in addition to a levitation effect. Under such conditions, circulating superconducting currents are established within the superconductor.

A typical example of a system featuring a combination of Type II superconductors and permanent magnets is disclosed in U.S. Pat. No. 4,886,778, which discloses a rotating shaft having two ends, each of which contains a permanent magnet and rotates in a socket clad with superconducting material. The shaft is made to levitate above the sockets by the repulsive forces which exist between the magnets and the superconductors. The incorporation of superconductors into the bearing design offers the possibility of rendering the bearings entirely passive. The design disclosed in U.S. Pat. No. 4,886,778 has the potential for achieving very high rotational speeds, in excess of ten thousand rpm. The interaction between the rotating magnetic axial element and its stationary superconducting support takes place across a gap permeated by a strong magnetic field emanating from permanent magnets embedded in the rotating element.

One difficulty with this and similar configurations lies with the presence of single dipoles which have fixed magnetic fields displaying natural asymmetry. Asymmetry within magnetic field distribution creates drag or dry friction on the rotating member and increases energy losses. Continuous drag is created by the variations of the magnetic field intensity inside the superconducting member, causing energy losses within the superconductor.

The design disclosed in U.S. Pat. No. 4,886,778 features a number of superconducting sockets supporting a permanent dipole magnet through the repulsive forces existing between the permanent magnet and the superconductor. The repulsive force between the magnet and the superconductor depends upon the intensity of the magnetic field as well as the gradient of the field. The gradient is related to the rate of change, in magnitude and direction, of the magnetic field from point to point in the gap between the magnet and the superconductor.

The stronger the magnetic field, the higher the magnetic flux penetration into the superconductor. Although such increased penetration is desirable to achieve higher magnetic stiffness and stability, increased penetration is undesirable in the presence of asymmetry. A combination of asymmetry and high magnetic flux penetration yields increased rotational friction and energy dissipation. Bearing effectiveness is increased by using a magnetic field having a high gradient, and a stronger magnetic field, both of which enhance the magnetic stiffness between the magnet and the superconducting members.

It would be desirable to have a magnetic bearing which would use the repulsive forces generated between a magnet and superconducting material and which would enable a rotating member to reach and sustain ultra-high rotational speeds with low energy dissipation. Specifically, there is a clear need for magnetic bearing systems that produce high magnetic stiffness with minimal magnetic field asymmetry, thus minimizing rotational friction and energy dissipation.

It would be desirable to have a bearing system which would be automatically stable for long periods of time and in all possible directions and which will not require external feedback or other control means to maintain stability.

It would be desirable to have an apparatus for magnetically suspending and centering a body which rotates about an axis.

It would be highly desirable to reduce the asymmetry of a magnetic field being produced by a single dipole.

It would be desirable to be able to generate higher forces and enhanced stability with low energy losses, than would ordinarily be possible with a simple combination of a superconductor and a rotating magnet.

It would be desirable to have a combined bearing system which would include both a gas bearing or an electromagnetic system for purposes of control and also a superconductor/magnet bearing.

It would also be desirable to minimized the dampening in the bearing system by minimizing the magnet asymmetry.

It would be desirable to have an auxiliary control system activated by signals from sensors, such as proximity probes, which are used detect the position of the shaft. The control system would be based on conventional feedback systems such as a gas, foil, tilt pad, or electromagnetic systems and would be activated whenever higher forces are required than those which the magnet is able to produce. The auxiliary system would remain activated until such required forces are again within the operating range of the superconductor and magnet bearing system.

It would be desirable to field cool the magnet to trap the magnetic field lines inside the superconductor and thereby effect high flux penetration as well as magnetic relaxation.

SUMMARY OF THE INVENTION

This invention successfully addresses the shortcomings of the presently known configurations by providing a non-contacting, rotating assembly which includes a floating, unsupported and stable rotatable member.

The assembly includes a rotating member and at least one stationary member. Mounted on the rotating member is a suitably shaped Type II superconducting material. Mounted on a stationary member is a set of permanent magnets configured as a quadrupole or as multiple dipoles. The quadrupoles or multiple dipoles are positioned to enable the magnetic fields generated by the permanent magnets to interact with the superconducting material and serve to center the shaft in the desired location.

In alternative embodiments of this invention, the permanent magnets can be replaced by other magnets, for example by electromagnets or persistent current loops.

In certain embodiments of the present invention, the positions of the permanent magnets and the superconducting material are interchanged with the superconductors attached to a stationary member and the permanent magnets, or electromagnets, mounted on the rotating member.

The present invention utilizes a quadrupole or multiple dipole magnet configuration. A quadrupole is formed with two dipole magnets are placed adjacent to one another with their poles oppositely aligned. The quadrupole produced by the two dipole magnets produces a magnetic field which is contained between the poles and is lateral to the superconductor.

The magnetic field created by the quadrupole or multiple dipole features a much steeper magnetic field gradient, i.e., the intensity and direction of the magnetic field varies more rapidly as a function of location. Thus, the magnetic stiffness is relatively higher for a quadrupole or multiple dipole magnet than for a single dipole.

The present invention discloses a magnetic bearing which combines magnets configured as quadrupoles or multiple dipoles and Type II superconducting materials. More specifically, the present invention is of the use of permanent magnets or electromagnets aligned to form quadrupoles or multiple dipoles which are positioned opposite members containing Type II high temperature superconducting materials.

A feature of the present invention relates to the twinning of either the magnet or the superconductor, or both. Twinning relates to the minimization of magnetic asymmetries by rotating two or more portions of the magnet or superconductor relative to each other to reduce the asymmetry in the magnetic field distribution. Reduction of the asymmetry reduces the non-uniformity of the magnetic field of the bearing system and decreases energy dissipation losses.

The quadrupole or multiple dipole structure of the present invention generates strong repulsive forces between the quadrupoles or multiple dipoles and the magnets because of the preferred orientation between the quadrupoles or multiple dipoles in the CuO superconducting materials. It is generally preferred that the magnetic field be parallel to the basal plane in the CuO Type II superconductor. The forces generated serve to confine the movable member and automatically center the member in all directions to produce multi-axis suspension.

BRIEF DESCRIPTION OF THE DRAWINGS

The above and other embodiments of the present invention may be more fully understood from the following detailed description when taken together with the accompanying figures wherein similar reference characters refer to similar elements throughout and in which:

FIG. 16 is a schematic depiction of a laminated superconductor located between a pair of magnetic poles;

DESCRIPTION OF THE PREFERRED EMBODIMENTS

Figure 1:
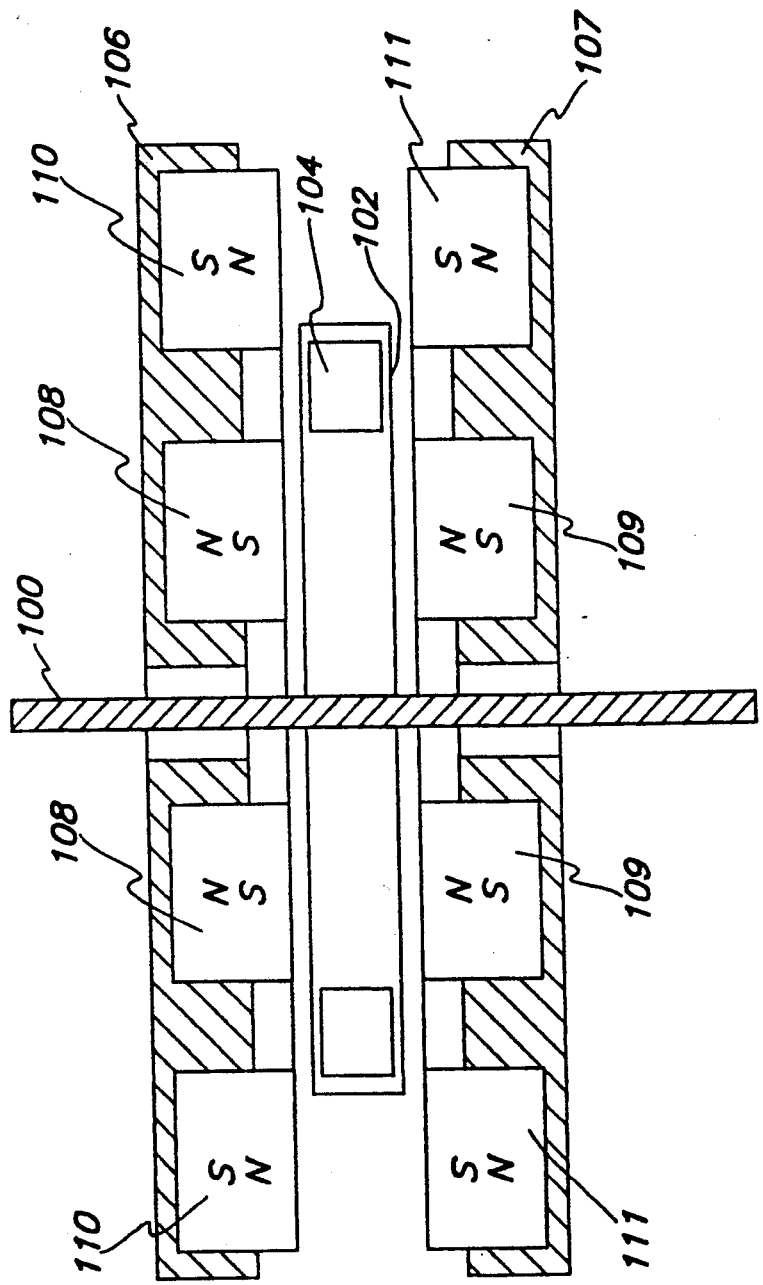
FIG. 1 is a cross-sectional view of the basic configuration of the high temperature superconductor quadrupole magnetic bearing (HTSQMB)

The present invention is of a novel suspended bearing. Specifically, this invention is of a magnetic bearing which takes advantage of the interaction between permanent magnets or electromagnets and Type II high temperature superconducting materials.

The recent discovery of the CuO class of high temperature superconducting ("HTS") materials has made it economical to take advantage of the repulsive forces between magnetic fields and superconducting materials.

The magnetic member is made of either a permanent magnet or a superconducting electromagnet. The permanent magnets are preferably made of rare earth magnetic material and exhibit a linear dipole.

Superconducting materials suitable for use in the present invention are the high temperature superconductors, of Type II. Currently known high temperature superconductors are generally perovskite materials, for example of the barium-yttrium copper oxide class. A preferred material is $YBa_2Cu_3O_x$. Thallium, bismuth or other ceramic-based compounds which exhibit Type II superconducting properties are also acceptable. Type II superconductors are characterized by first and second values of critical field, $H_{c,1}$ and $H_{c,2'}$, where field penetration first occurs above $H_{c,1}$.

The present invention uses quadrupole or multiple dipole configurations. A quadrupole is formed when two dipole magnets are located adjacent to each other in such a way that their poles are oppositely aligned. A multiple dipole, such as an octopole, created by four dipole magnets with facing like poles, produces a magnetic field of higher flux density than a simple dipole and can usefully be utilized in a journal bearing system. An octopole is created by placing four dipoles with like pole orientation and opposite adjoining faces next to each other. The effect of a multiple dipole, such as an octopole, is to cause the magnetic flux to be pressed outward, thereby increasing the flux density on the stationary member of the journal.

In an alternative embodiment, a dipole, quadrupole or multiple dipole is placed on a rotating shaft enclosed by stationary HTS material. On the outside of the HTS is an oppositely oriented magnetic field. This configuration forces the magnetic field lines generated by the magnet on the shaft back toward the shaft and is able to support higher thrust forces than those which a simple HTS and a magnet configuration alone would be able to withstand. This system could be incorporated as part of a journal bearing system, allowing for higher journal load capacities. The increased lateral gradient enhances the magnetic stiffness and keeps the rotating member more firmly in place.

The magnetic field created by the quadrupole possesses a much steeper gradient than a comparable dipole magnetic field. Thus, the intensity and direction of the magnetic field vary more rapidly for a magnetic field produced by a quadrupole or multiple dipole magnet.

In the process of manufacturing permanent magnets or cores for electromagnets, certain asymmetries are introduced which cause the produced magnet or core to generate a non-uniform magnetic field. Such asymmetry results in the dissipation of energy and is to be avoided or minimized.

It is a feature of the present invention that the effect of such asymmetry can be significantly reduced by "twinning" the permanent magnet or core. By "twinning" is meant the process of cutting a magnet, or simple dipole, in a direction perpendicular to its internal magnetic field lines into two or more sections. The sections of the dipole are then rotated relative to each until a relative position is found which tends to minimize the asymmetry in the magnetic field distribution. At this point the relative position of the sections of the dipole are fixed and the twinned dipole is installed in the bearing.

The twin dipole is thus made up of two single dipoles, with facing opposite poles, and which are permanently attached to each other to form a single dipole with relatively uniform magnetic field distribution.

The present invention combines dipole, quadrupole or multiple dipole magnets and superconducting materials. More specifically, the present invention discloses and claims the use of permanent magnets or electromagnets aligned to form dipoles, quadrupoles, twin dipoles, octopoles, or hybrid magnet/HTS/magnet systems. The magnetic field is preferably positioned opposite of the Type II high temperature superconducting materials so that the magnetic field is parallel to the basal plane of the CuO based Type II material.

The repulsive forces serve to automatically center and stabilize the rotating member in all directions. Because of the unique shapes of the quadrupole, twin dipoles, octopoles, or hybrid magnet/HTS/magnet systems, the structure results in strong repulsive forces while simultaneously controlling magnetic field distribution.

The present invention can be better understood with reference to several of the its embodiments which are described below.

Referring now to the figures, FIG. 1 illustrates the basic configuration of the present invention. The bearing assembly includes a rotating member, typically a shaft 100, which is to be centered at a particular location. Shaft 100 is typically rotating and is connected to some device, such as a motor, a generator, and the like.

It is desirable to keep the rotating shaft 100 at a particular location and, in particular, to avoid any translation of any portion of shaft 100 or in a direction extending radially outward from shaft 100.

Firmly attached to rotating shaft 100 is a rotating disk 102 of a certain diameter and thickness. Disk 102 is made of non-metallic materials. Mounted onto disk 102 is a ring 104 of Type II superconducting material.

Permanently and non-rotationally mounted above rotating disk 102 is a top stationary plate 106, typically made of a ferrous material to be capable of serving to contain the magnetic flux. A similar bottom stationary plate 107 is located below rotating disk 102.

Mounted on each stationary plate 106 and 107 are inner rings of permanent magnets 108 and 109, and outer rings of permanent magnets 110 and 111. Inner and outer rings, 108 and 109, and 110 and 111, respectively, are mounted so that outer rings 110 and 111 will have a diameter somewhat larger than that of superconducting ring 104, and so that inner rings 108 and 109 will have a diameter somewhat smaller than that of superconducting ring 104.

Inner and outer rings, 108 and 109, and 110 and 111, respectively, are oriented so that the two poles point in a direction parallel to the axis of shaft 100, but are oppositely oriented to each other. Together, the inner and outer rings, 108 and 110, respectively, of top stationary plate 106 thus form a quadrupole. Similarly, the inner and outer rings, 109 and 111, respectively, of bottom stationary plate 107 are also oriented as shown to also create a quadrupole.

It is to be noted that inner rings 108 and 109 are oppositely oriented relative to each other, as are outer rings 110 and 111. The quadrupoles serve to create a magnetic field of very high gradient near the magnet surface. Such a gradient strongly repels any superconducting materials in the vicinity of the magnet surface.

The quadrupoles are positioned to enable the magnetic fields generated by permanent magnets 108, 109, 110 and 111, to interact with the superconducting material to stabilize shaft 100 in all directions in the desired location.

In operation, rotating shaft 100 would be completely stabilized in all directions by the mutual repulsion of the permanent magnets and the superconducting material. Whenever shaft 100 would start to translate to bring shaft 100 closer to the magnets, strong repulsive forces would come to bear and serve to automatically force shaft 100 back to the desired equilibrium position.

Figure 2:
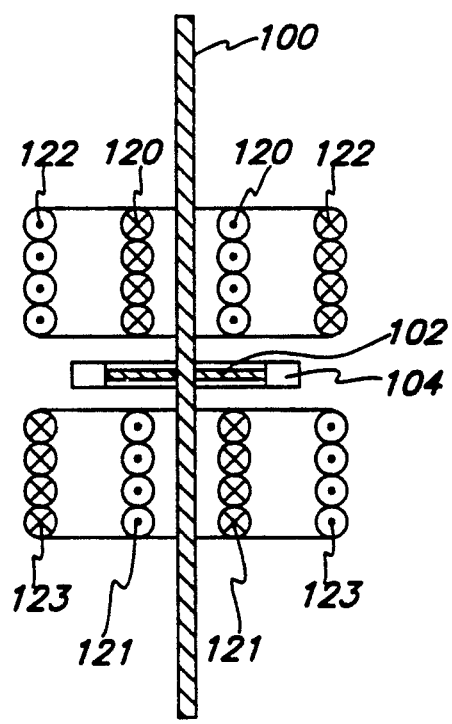
FIG. 2 is a cross-sectional view of an HTSQMB as in FIG. 1 but wherein the permanent magnets have been replaced by electromagnets.

As can be seen in FIG. 2, the magnetic members are not limited to permanent magnets. In the embodiment shown in FIG. 2 the permanent magnets have been replaced with electromagnets. In FIG. 2 the convention is followed that current going into the page is denoted by "x" while current coming out of the page is denoted by ".". It is to be noted that inner coils 120 and 121, and outer coils 122 and 123 are Oriented quite similarly to the permanent magnets of FIG. 1 to create comparably oriented quadrupoles and the associated effects.

The alternative embodiment shown in FIG. 2 has the possible advantage of being capable of creating greater magnetic field densities than those produced by permanent magnets.

As a further refinement, it may be desirable for the electrical coils of the electromagnets to be produced from a high temperature superconducting material. Coils made from such materials and kept at temperatures below the critical temperature have the ability to sustain a current undiminished. Such an embodiment, involving HTS electromagnets, would thus be quite useful, for example, in outer space applications where low temperatures are easy to maintain and where it is important to use bearings which are as small as possible in order to minimize the payload of the launching rocket.

In the alternative embodiments which follow, only permanent magnets are shown. This is done for ease of presentation with the understanding that electromagnets could, in many or all of these embodiments, be substituted for the permanent magnets shown.

Figure 3:
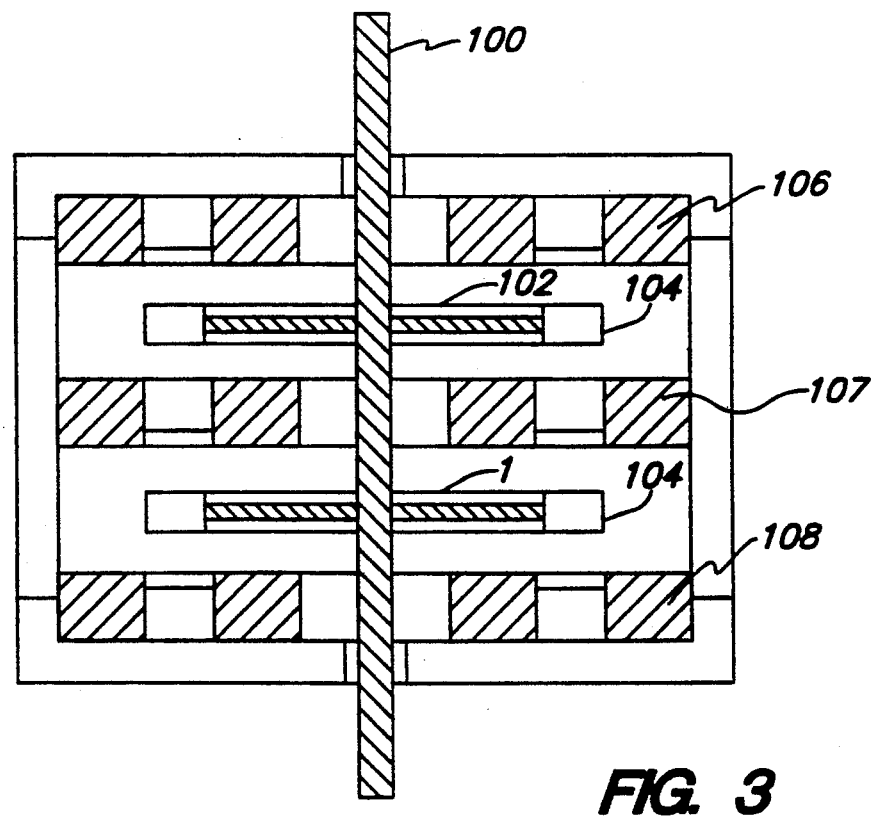
FIG. 3 is a cross-sectional view of an HTSQMB as in FIG. 1 but featuring two disks containing HTS material mounted on the rotatable element.

FIG. 3 shows a slight refinement of the basic configuration of FIG. 1. Shown is a configuration wherein two rotating disks 102, rather than one, as in FIG. 1, are attached to shaft 100. This, of course, requires the use of at least three stationary plates, 106, 107 and 108. The use of two rotating disks 102 lends added stability and rigidity to the bearing. Clearly, additional rotating disks 102, beyond the two shown in FIG. 3 could be used to achieve further rigidity.

Figure 4:
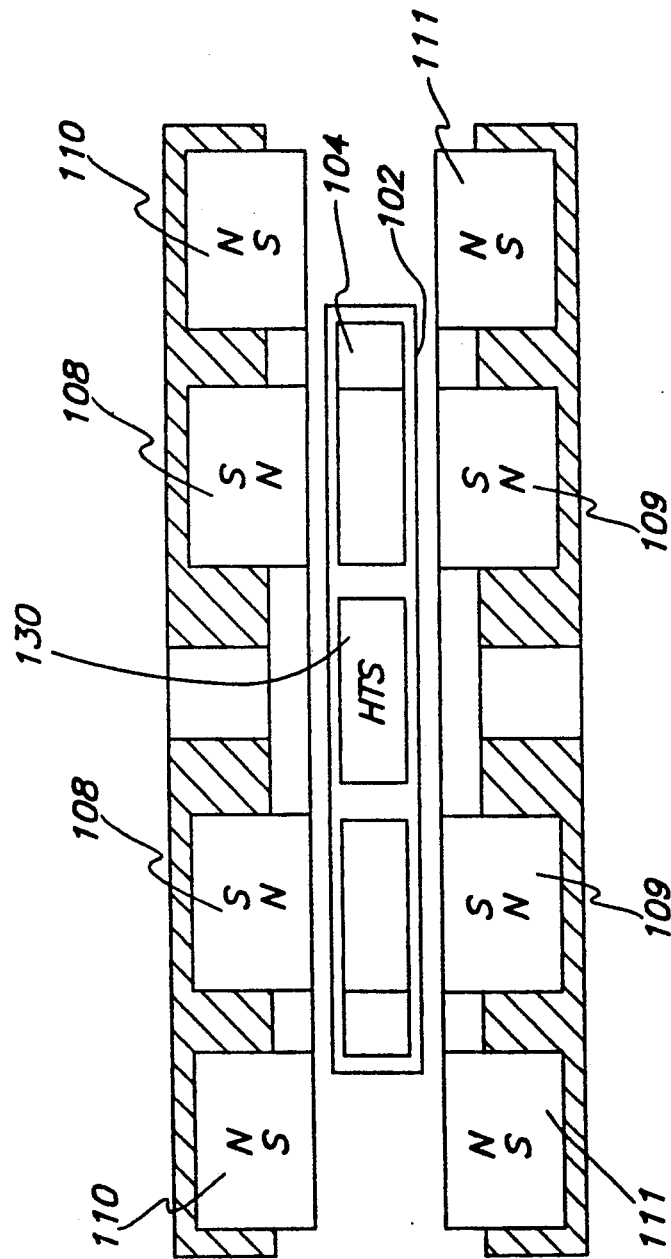
FIG. 4 is a cross-sectional view of an HTSQMB as in FIG. 1 with additional HTS near the location of the rotating shaft.

Shown in FIG. 4 is another arrangement of the superconducting materials. The permanent magnet arrangement is identical to that shown in FIG. 1. Like the arrangement in FIG. 1, there is a ring of superconductor material 104 interposed between the two sets of permanent magnet rings, both radially and axially. In contrast with the configuration of FIG. 1, the configuration of FIG. 4 also features an inner disk 130 of superconducting material. Inner disk 130 has a diameter smaller than the diameter of inner permanent magnet rings 108 and 109.

The configuration demonstrated in FIG. 4 does not include a shaft. It can be readily appreciated that when it is desired to include a shaft, it may be necessary to use an inner ring of superconductive material rather than a disk 130. The presence of inner disk 130 or ring of superconductive material enhances the repulsive forces and increases the stability and rigidity of the movable member.

Figure 5:
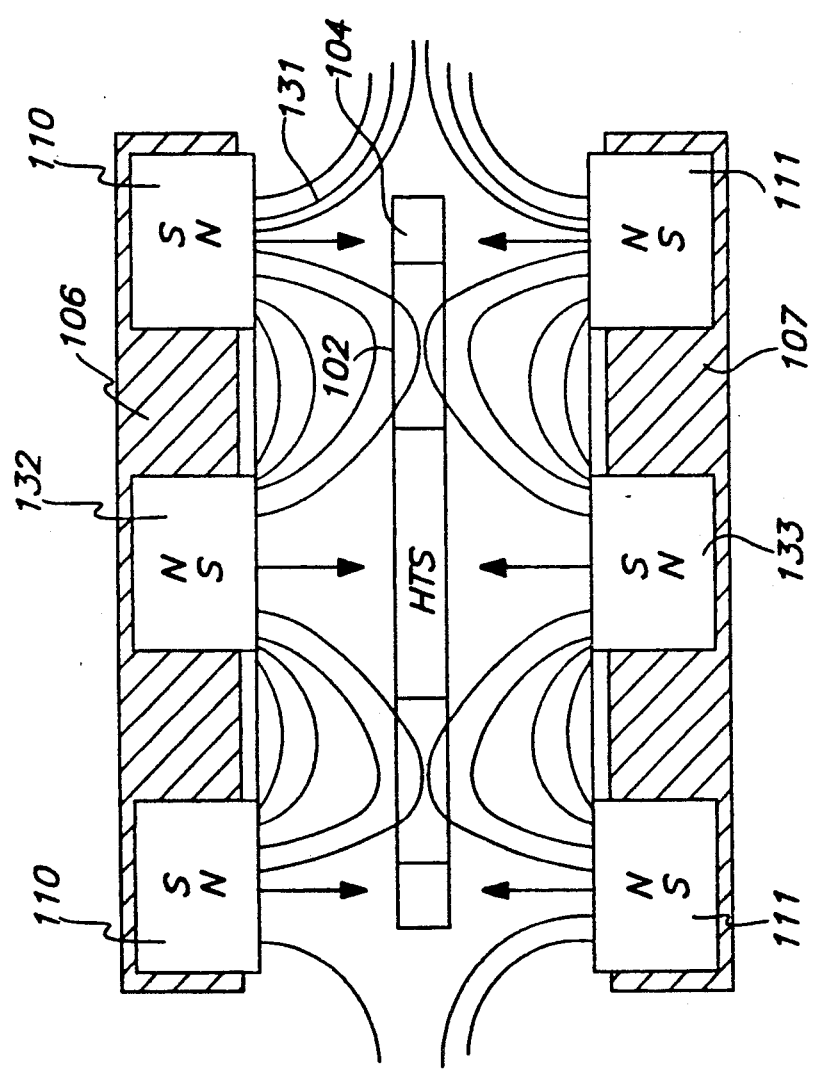
FIG. 5 is a cross-sectional view of an HTSQMB as in FIG. 4 showing schematically the magnetic field lines.

That the addition of an inner ring or disk of superconductive material to the movable member enhances the stability can be seen from FIG. 5, which schematically depicts the magnetic field lines 131 for a slightly modified magnet configuration. In the configuration of FIG. 5, the inner permanent magnet ring of FIGS. 1, 2, and 4, has been replaced by a permanent magnet disks 132 and 133. It can be seen that permanent magnets 132, 133, 110, and 111, create two magnetic quadrupoles, with magnetic field lines 131 approximately as shown. The HTS material is located in the areas of low magnetic field areas. The magnetic field symmetry is such that movement of the HTS materials in any direction would bring to bear strong repulsive forces tending to return the movable member to its most stable equilibrium position.

Figure 6:
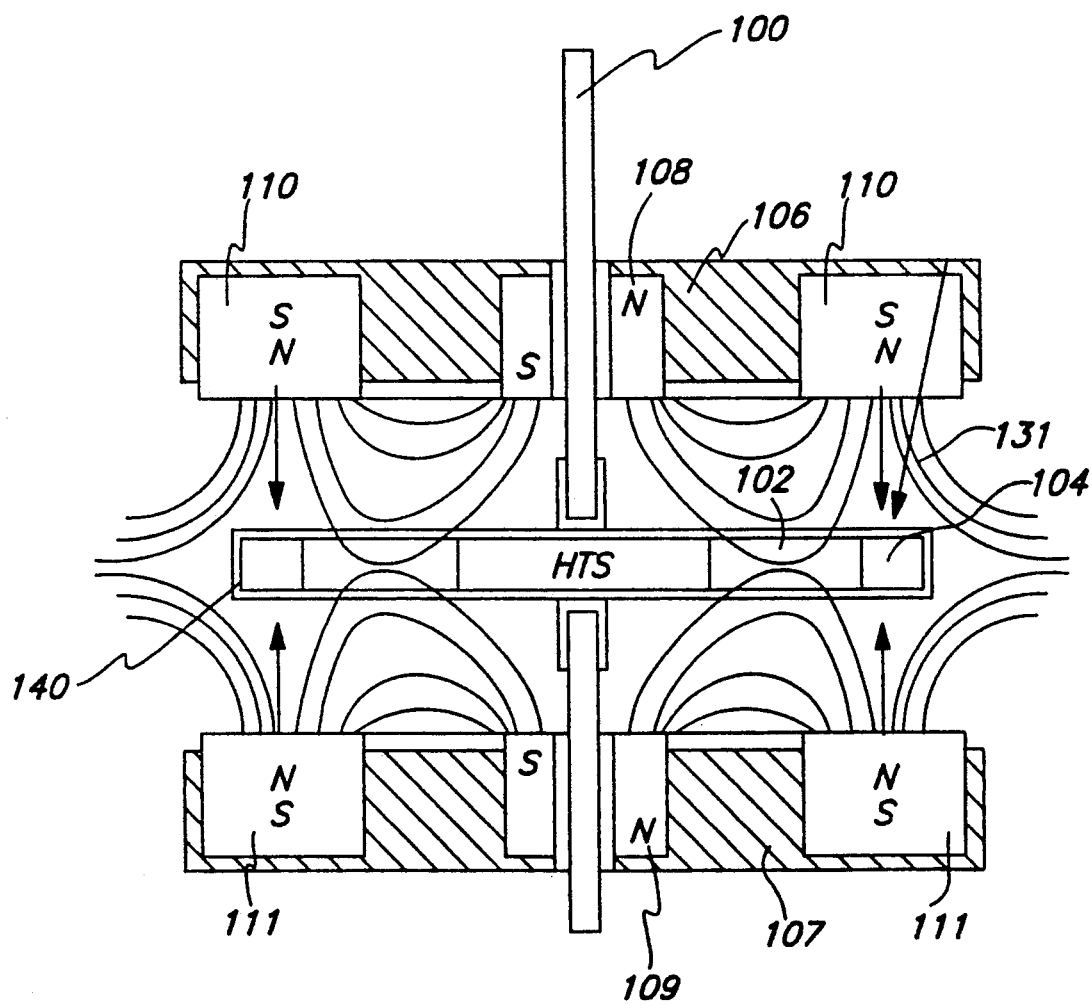
FIG. 6 is a cross-sectional view of an HTSQMB as in FIG. 5 with the addition of a shaft.

FIG. 6, like FIG. 5, shows the magnetic field lines. Unlike FIG. 5, FIG. 6 features a shaft 100 to which the movable structure containing the superconducting materials are attached. It can be seen that inner permanent magnets 108 and 109 are here shaped as rings to accommodate shaft 1?0. It is also to be noted that rotating disk 102 is shown as being clad by a casing 140. Casing 140 may be necessary to give rotating disk 102 added strength which the HTS materials themselves may lack, particularly during high rotational speeds.

In certain embodiments of the present invention, the positions of the permanent magnets and the superconducting material may be reversed with the superconductors being stationary and the permanent magnets, or their equivalents, being mounted on the rotating member. Two such configurations are shown in FIGS. 7 and 8.

Figure 7:
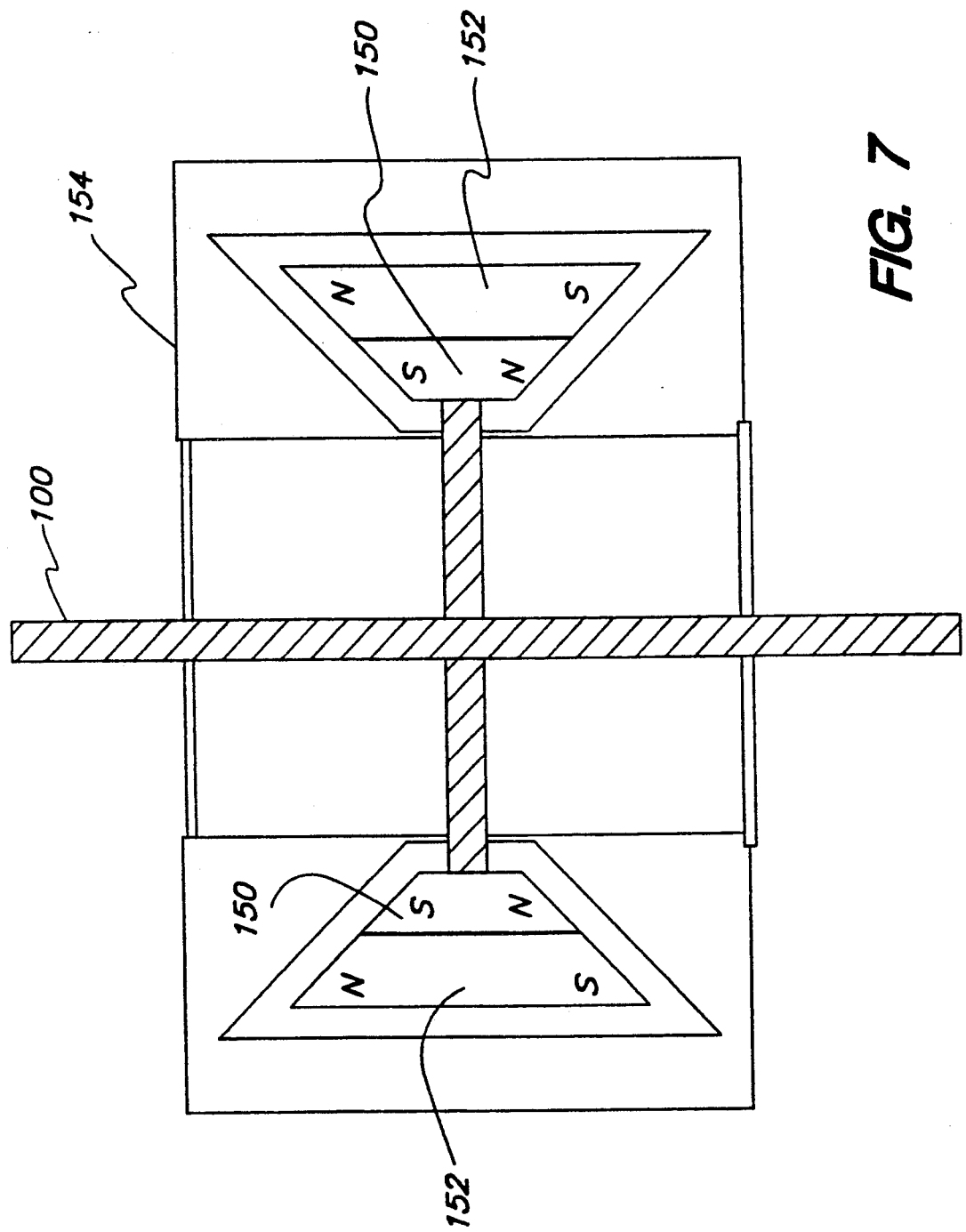
FIG. 7 is a cross-sectional view of a magnetic bearing wherein the quadrupole is attached to the rotating member and the HTS is stationary.
Figure 8:
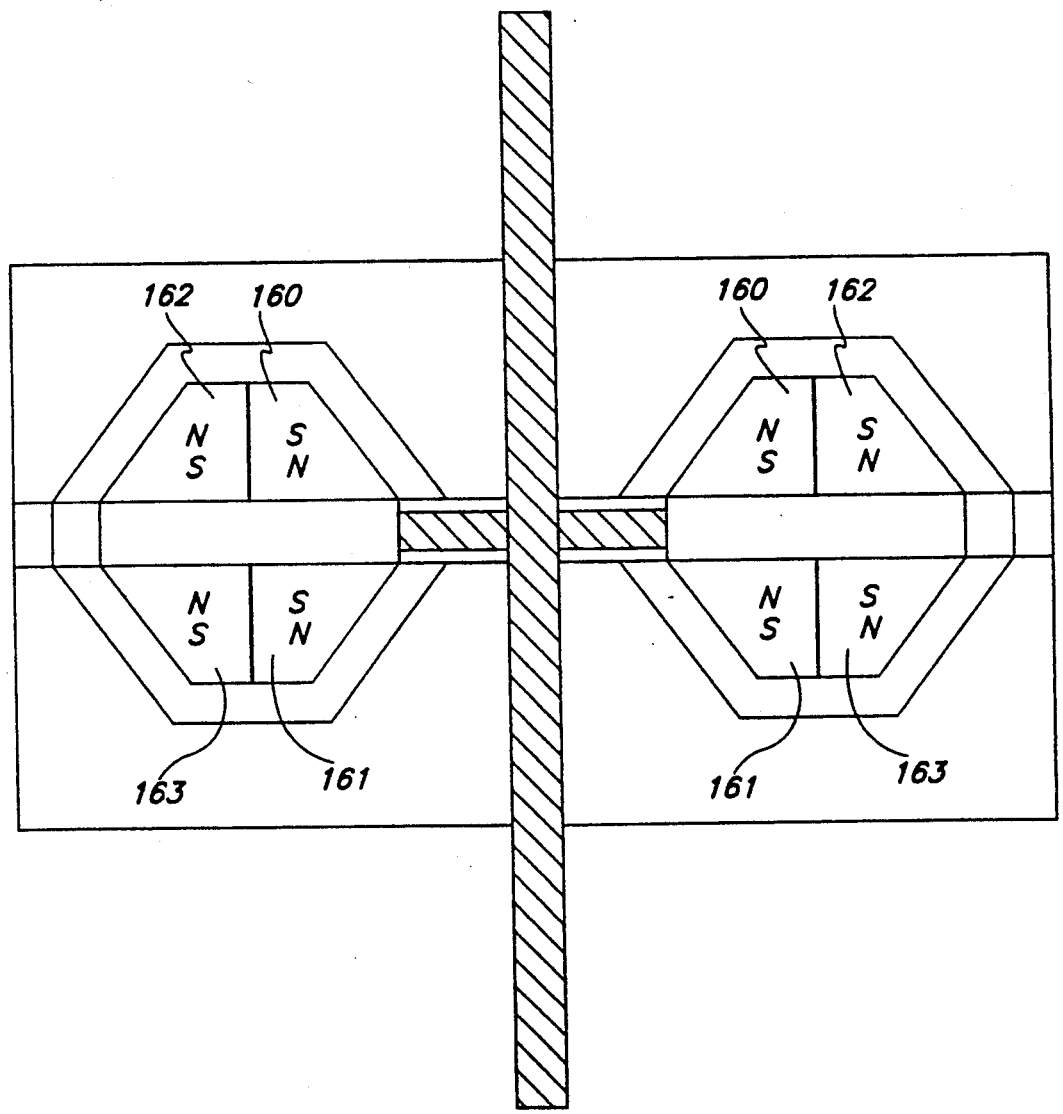
FIG. 8 is a cross-sectional view of a magnetic bearing as in FIG. 7 wherein two sets of quadrupoles are attached to the rotating member and the HTS has an hexagonal configuration.

The bearing of FIG. 7 shows a rotating shaft 100 onto which are mounted two contiguous and oppositely oriented permanent magnet rings 150 and 152. The two magnet rings 150 and 152 together form a trapezoidal cross-sectional shape with the two parallel sides oriented in the direction of shaft 100 and with the shorter of the two parallel sides closer to shaft 100. Each of magnet rings 150 and 152 is itself trapezoidal in cross-sectional shape and is oriented in the direction of shaft 100. Inner magnet ring 150 is smaller than outer permanent magnet 152.

The repulsive forces tending to stabilize the location of shaft 100 are comparable to those of the earlier configurations. The vertical HTS wall and the vertical components of the slanted HTS walls tend to give shaft 100 radial stability, while the horizontal components of the slanted HTS walls tends to give shaft 100 axial stability.

The configuration of FIG. s shows a somewhat more sophisticated and preferred version of the structure shown in FIG. 7. Each of rings 150 and 152 of FIG. 7 has been broken into two separate magnet rings, 160 and 161, and 162 and 163, respectively. For example, the inner ring 150 of FIG. 7 has been replaced by inner rings 160 and 161 in FIG. 8. More importantly, while the inner rings 160 and 161 approximately resemble the inner ring 150 of FIG. 7, outer rings 162 and 163 display a shape which is quite different from that of outer ring 151 in FIG. 7. The advantage of this approximately hexagonal shape is that more slanted surfaces are available to provide axial stability to the shaft 100.

The HTS-quadrupole interaction can be used not just in conjunction with rotational bearings but can, in addition, be used in other applications, for example, where it is desired to translate two surfaces past each other and it is important to reduce or eliminate the frictional forces which would otherwise result.

One such application arises in conjunction with linear bearings which allow two surfaces to frictionlessly slide past each other. As is the case with rotating bearings, the linear bearing can feature magnets which are mounted either onto the movable member or onto the stationary member. For convenience, the various embodiments of the linear bearing shown herein all feature magnets which are mounted onto the movable member.

Figure 9:
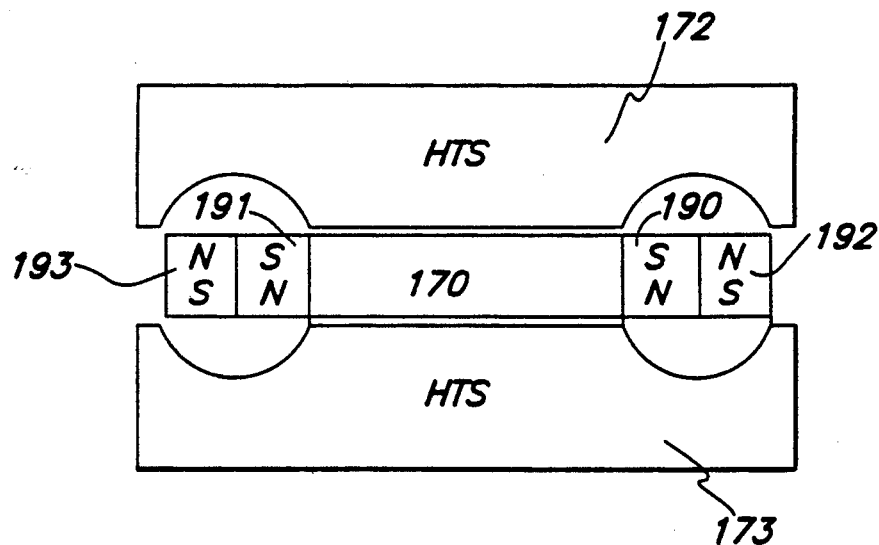
FIG. 9 is a cross-sectional view of a linear magnetic bearing with the quadrupole mounted on the sliding member.

One such configuration is shown in FIG. 9. Here the movable member 170 features two quadrupoles, one at each of its ends. The quadrupole is formed by permanent magnets arranged in the form of right and left horizontally oriented inner tracks, 190 and 191, respectively, and adjoining right and left horizontally oriented outer tracks, 192 and 193, respectively. Movable member 170 can be made to slide frictionlessly along the stationary members, 172 and 173, which are made of HTS material.

It is to be noted that the HTS material is specifically shaped to create certain arched voids which are shaped to contain the magnetic field with no penetration, or with minimal penetration of the HTS material by the magnetic field. The shaping of the HTS material tends to stabilize the element 170 and keep it in its desired position. Motion of movable element 170 can be effected by conventional means in the same manner as is done in an LSM or a stepper system.

Figure 10:
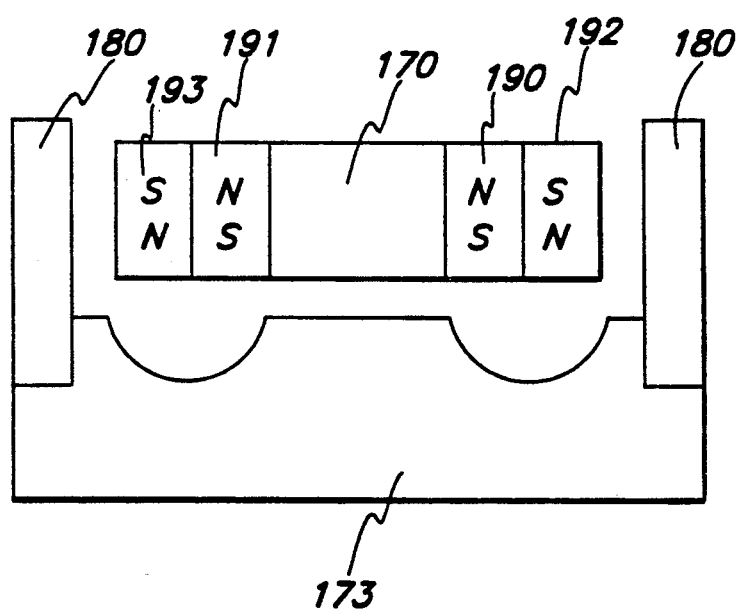
FIG. 10 is a cross-sectional view of a linear magnetic bearing as in FIG. 9 with HTS side tracks.

Another embodiment of the linear bearing is shown in FIG. 10. In contrast to the embodiment of FIG. 9, this configuration calls for tracks 180 made of HTS materials on either side of movable element 170. HTS tracks 180 provide additional repulsive forces tending to better confine movable element 170 in the desired location.

Figure 11:
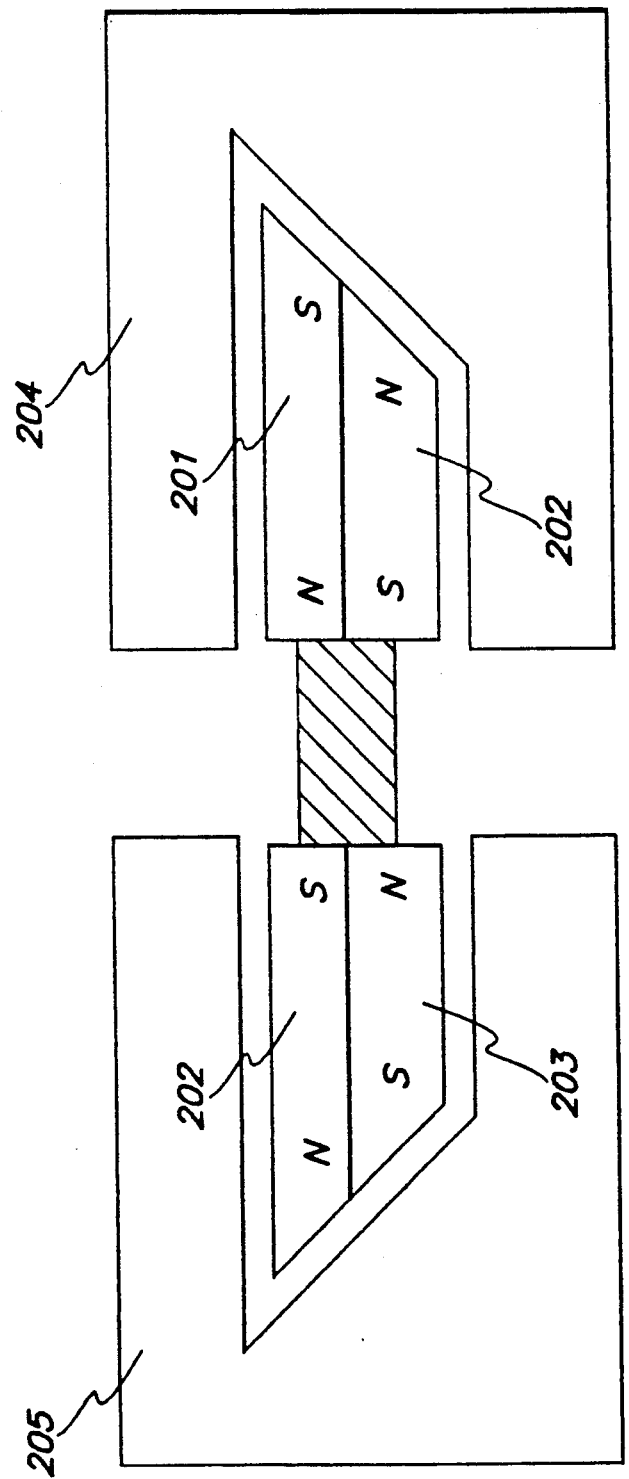
FIG. 11 is a cross-sectional view of a linear magnetic bearing as in FIG. 9 with HTS having somewhat different geometry.
Figure 12:
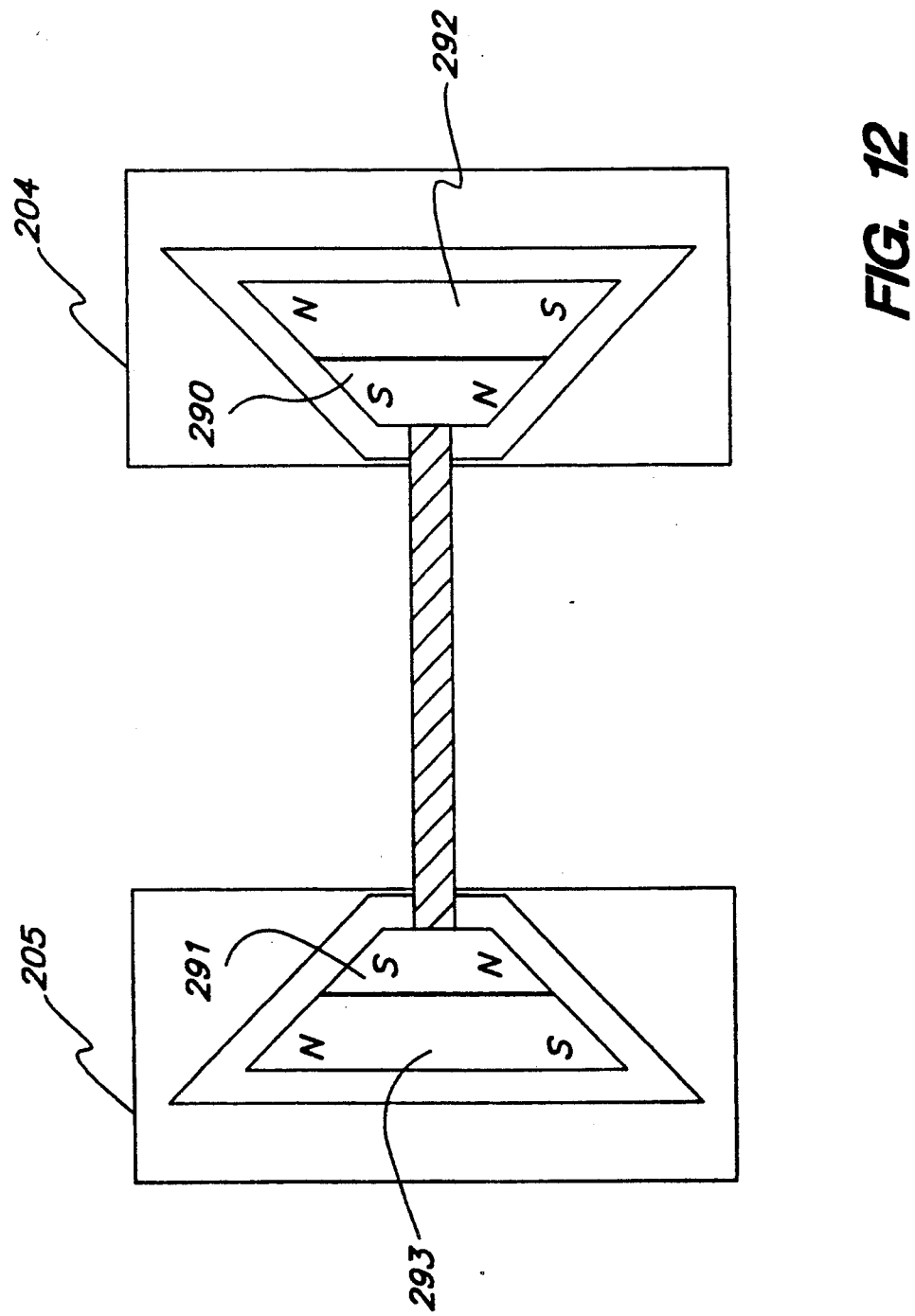
FIG. 12 is a cross-sectional view of a linear magnetic bearing as in FIG. 9 with HTS having somewhat different geometry.

FIGS. 11 and 12 show still other embodiments of the linear bearing. In contrast With the configurations of FIGS. 9 and 10 where the HTS material is shaped to confine the magnetic field lines, the configurations shown in FIGS. 11 and 12 feature permanent magnets shaped as upper right and left tracks, 200 and 201, respectively, and lower right and left tracks, 202 and 203, respectively. The permanent magnet tracks are surrounded by right and left HTS, 204 and 205, respectively. The tracks are shaped in Ways similar to those shown in FIGS. 7 and s for the case of the rotating bearing. The efficacy of the shapes shown in FIGS. 11 and 12 Can be appreciated from the figures and from the previous discussion of FIGS. 7 and s.

It is notable that the permanent magnets displayed in FIG. 11 are oriented in a horizontal direction rather than in a vertical direction as heretofore shown. The quadrupole is formed by permanent magnets arranged in the form of vertically oriented right and left inner tracks, 290 and 291, respectively, and adjoining vertically oriented right and left outer tracks, 292 and 293, respectively. It should be appreciated that the physical orientation of the magnets in a vertical or in a horizontal direction, while possibly affecting the ease of manufacture of the bearing, is otherwise immaterial for the functioning of the bearing, provided the magnetic poles of the magnets are properly oriented.

FIG. 13 again demonstrates the possibility of shaping the HTS material to form a Void of a certain shape capable of confining the magnetic field lines, this time in connection with a rotational bearing. The quadrupole is formed by permanent magnets arranged in the form of vertically oriented inner and outer magnetic rings, 390 and 391, respectively. An analog of this configuration was earlier discussed in the context of the linear bearings of FIGS. 9 and 10.

Figure 13:
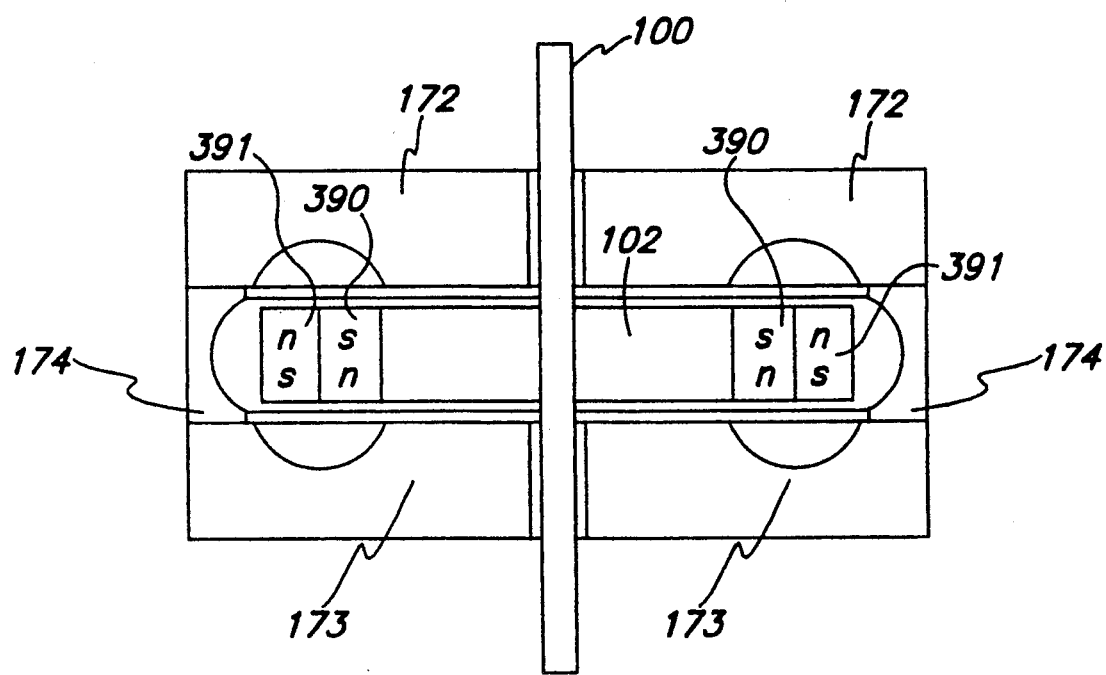
FIG. 13 is a cross-sectional view of a rotating magnetic bearing with the quadrupole attached to the rotating member.
Figure 14:
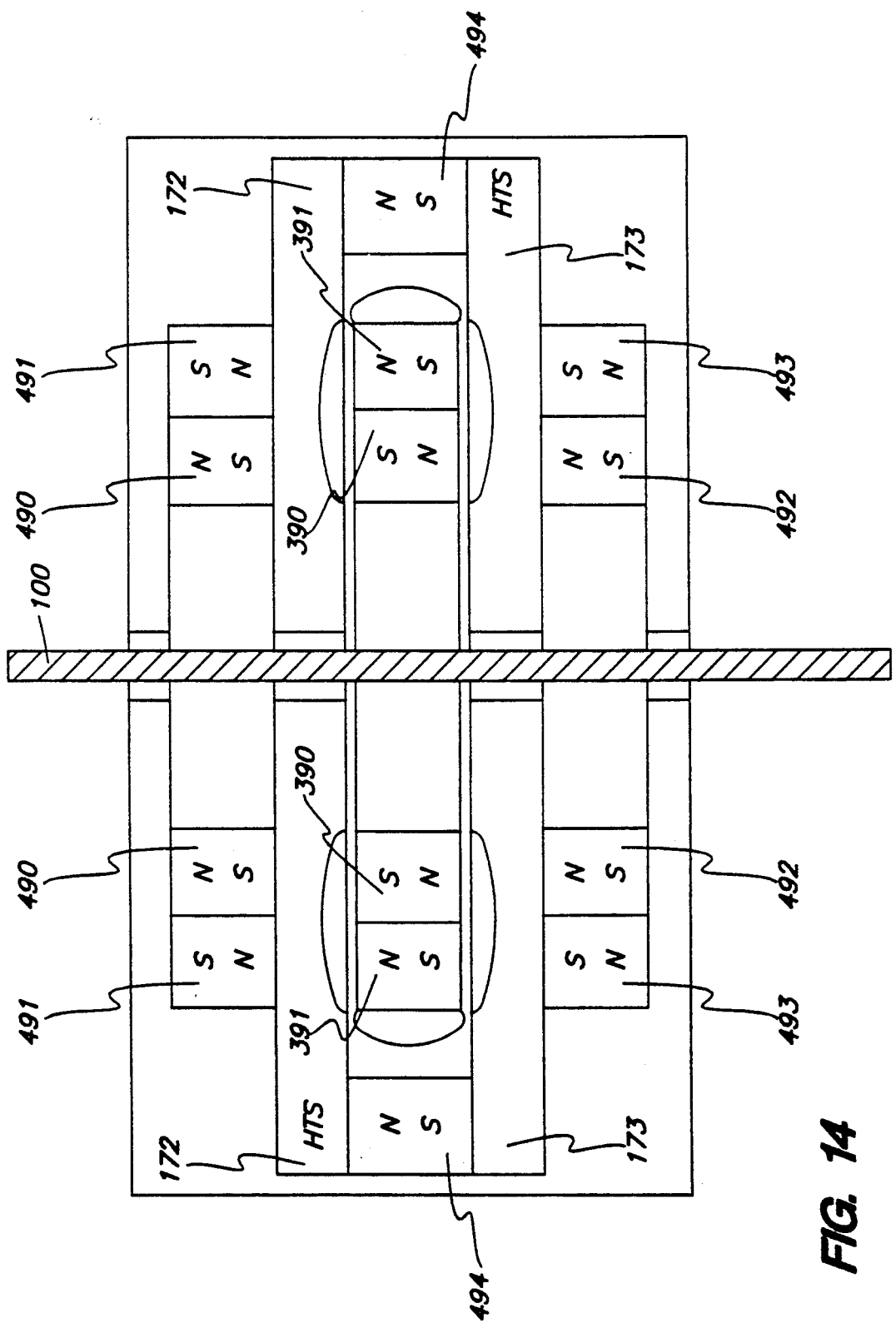
FIG. 14 is a cross-sectional view of a rotating magnetic bearing as in FIG. 13 with additional quadrupoles mounted in the stationary member.

FIG. 14 shows an improved version of the bearing shown in FIG. 13. The configuration shown in FIG. 13 resembles the configuration of FIG. 14. Both configurations feature a pair of permanent magnet rings, 390 and 391, mounted on movable element 102 with properly shaped stationary HTS material, 172, 173, and 174, located above, below, and to the Outside, respectively, of movable permanent magnets, 390 and 391.

By contrast with the configuration of FIG. 13, the configuration of FIG. 14 also features additional permanent magnets, 490/491, 492/493, and 494, permanently mounted onto the stationary member, above, below, and to the outside, respectively, of rotational permanent magnets, 390 and 391. Specifically, FIG. 14 shows rings of permanent magnets, 490/491, 492/493, mounted above and below, respectively, each of the two movable permanent magnet rings, 390 and 391. The upper and lower stationary permanent magnet rings, 490/491 and 492/493, respectively, are mounted with their poles directed opposite those of the corresponding movable permanent magnet ring. Furthermore, an additional stationary permanent ring, 494, is mounted to the outside of the rotating outer magnet ring, 391, with its poles oppositely oriented from those of the outer movable permanent magnet ring, 391.

The purpose of stationary permanent magnets 490/491, 492/493, and 494, is to further repel the magnetic field generated by the movable magnets and keep any magnetic field lines which would otherwise enter the HTS material from penetrating the HTS material. Completely eliminating or keeping to a minimum the magnetic field penetration of the HTS material lowers the extent of flux pinning and reduces the drag force on the rotating member, thus making for smoother and more stable operation of the bearing.

Figure 15:
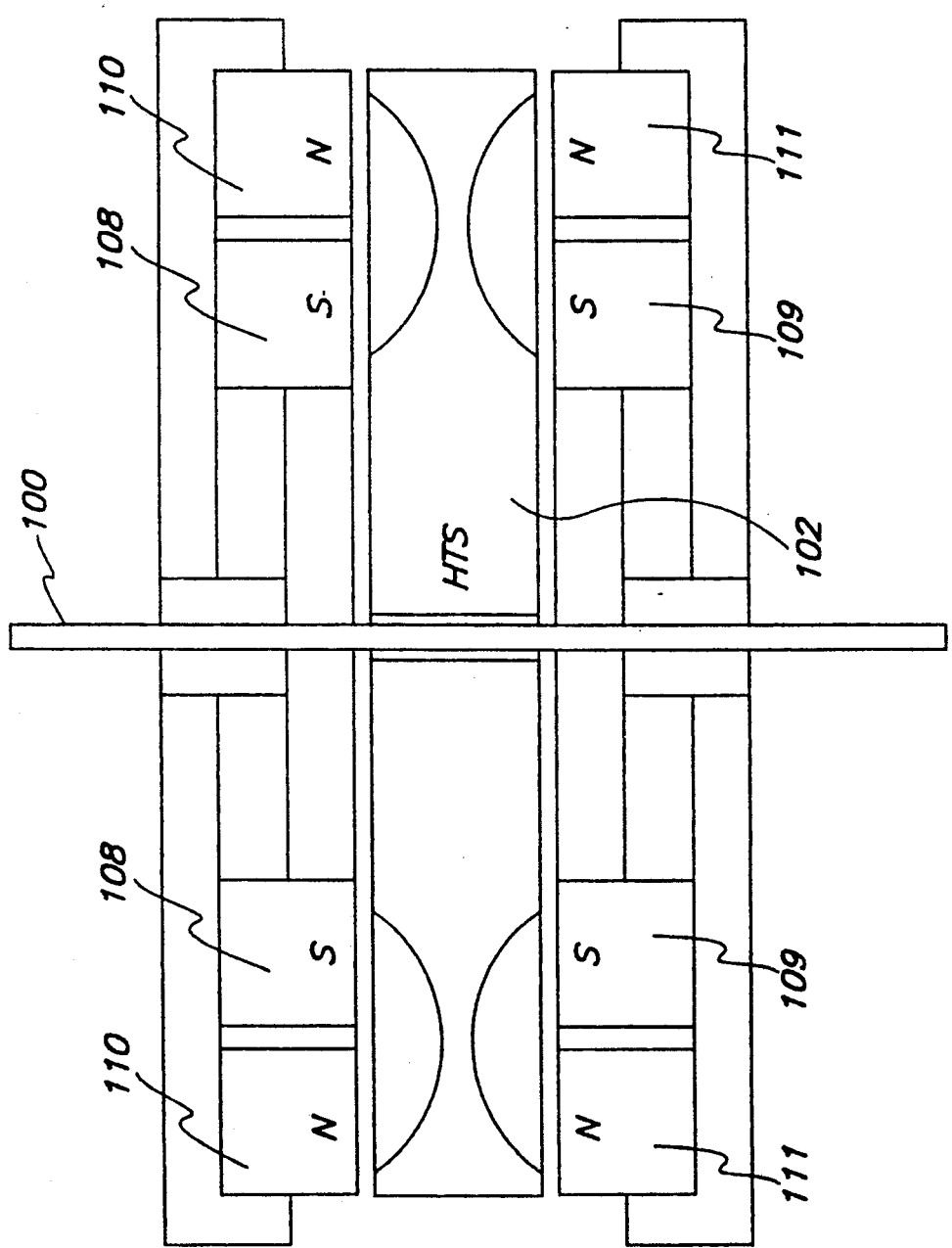
FIG. 15 is a cross-sectional view of an HTSQMB as in FIG. 1 with specially shaped HTS.

Yet another possible embodiment is shown in FIG. 15. The configuration resembles that shown in FIG. 1 in that both configurations involve two pairs of rings of stationary permanent magnet, 108, 109, 110, and 111, and a movable element, 102, which includes HTS materials. The configuration in FIG. 15 differs from the configuration of FIG. 1 in that the HTS material of the movable member is shaped to confine the magnetic field lines generated by the quadrupoles and thus stabilize the movable member in its equilibrium position.

The devices disclosed can be further improved by replacing the HTS block material in each device with a laminated superconductor. Lamination of the superconductor can be achieved by stacking alternating layers of HTS and an insulator, typically a ferromagnetic or non-ferromagnetic material. A suitable material for use in the insulating layers of the laminated superconductor is mumetal, or permaloy. Layering the superconductor creates additional surface area. The insulator layers of the superconductor serve to concentrate the magnetic flux, thorough the Meissner effect. This effect produces higher magnetic forces than would be produced by flux pinning. Hence, use of laminated superconductor in a magnetic bearing increases the magnetic stiffness and provide better lifting force.

Figure 21:
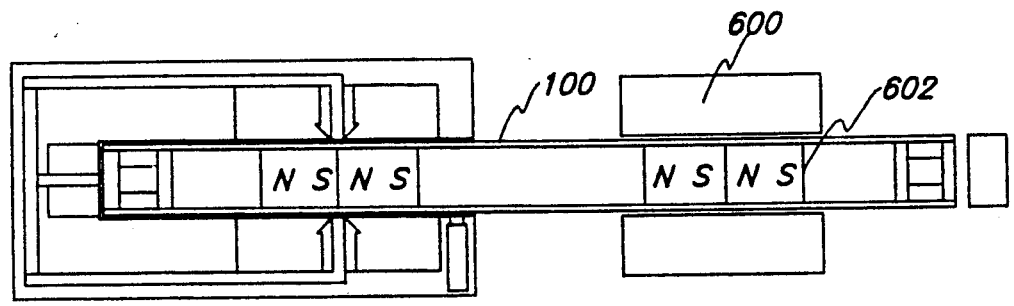
FIG. 21 is a cross sectional view of the thrust and journal bearing of FIG. 19 featuring additional journal bearing.

Shown in FIG. 21 is a schematic blow-up view of a laminated superconductor interposed between two magnetic poles. It can readily be appreciated that the laminations can be contoured and be made to assume any desired shape which will be roughly parallel to the magnetic field lines. For example, the optimal orientation of the laminations in the case where the superconductor is located above the two magnetic poles would be curved to simulate the curvature of the magnetic field lines.

Figure 17:
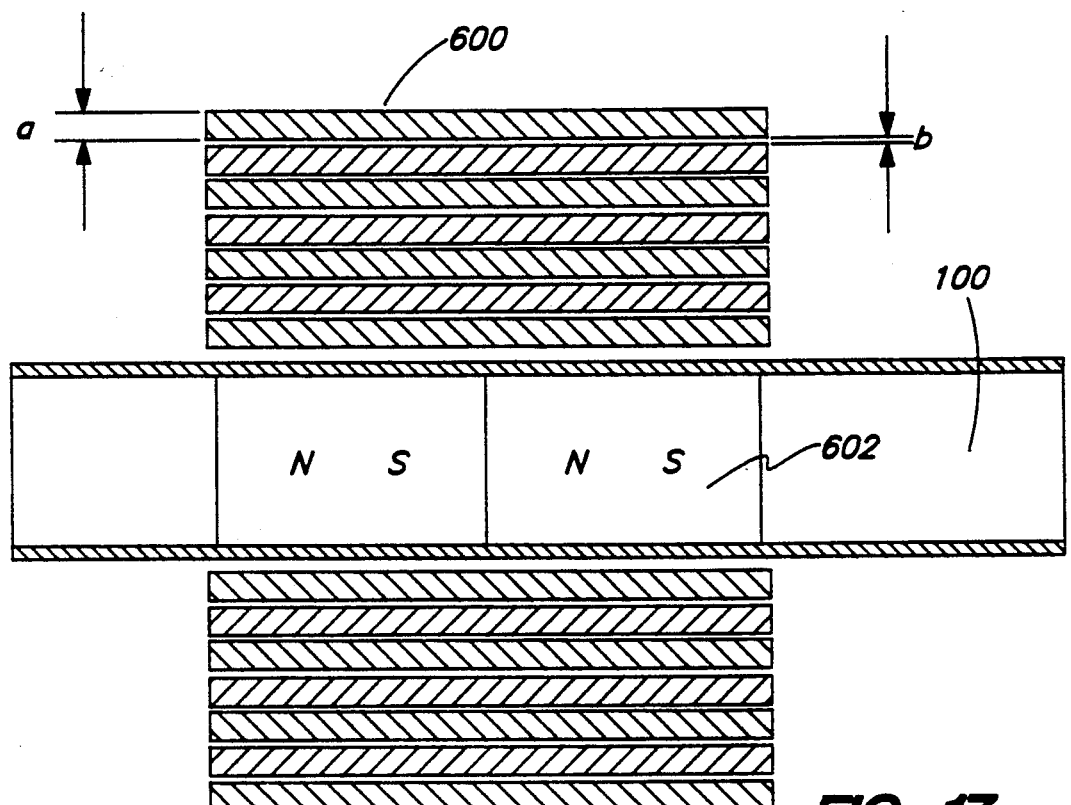
FIG. 17 is a view of a twinned dipole surrounded by stationary laminated superconductor.

Shown in FIG. 17 is a journal bearing application of the concept of laminating the HTS to enhance the performance of the system. The stationary laminated superconductor 600 is shown with the laminations oriented in the horizontal direction to approximate the orientation of the magnetic field lines generated by the permanent magnet 602 located on the rotating shaft 100. The laminated superconductor 600 can be characterized by the relative thicknesses of the HTS and insulator layers. IN FIG. 17 the HTS thickness is indicated as "a" while the insulator thickness is indicated by "b".

Figure 18:
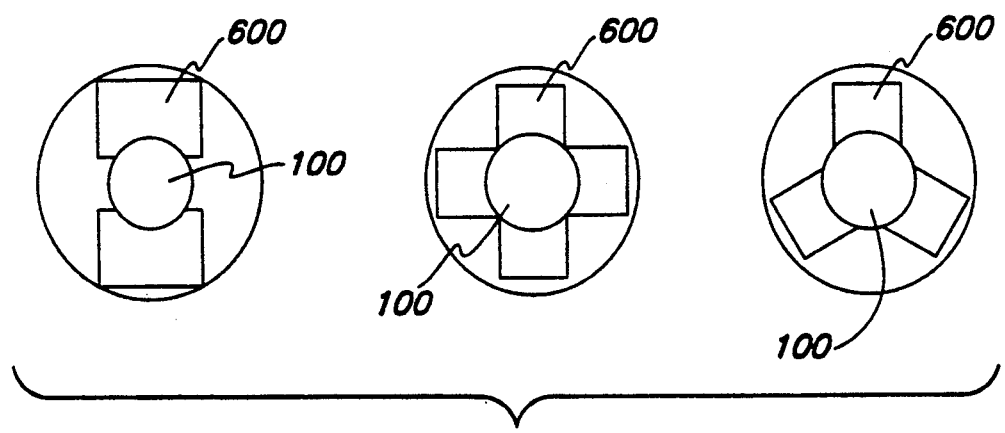
FIG. 18 shows three possible configurations for the superconductor of FIG. 17.

The laminated superconductor 600 may completely surround the shaft 100 or it may take on any convenient, and preferably symmetrical, configuration around the shaft 100. Shown in FIG. 18 are three possible configurations including two, three and four bodies of superconductor material.

FIG. 17 also illustrates the twinning of a dipole which was discussed above. Such twinning can be carried out for any of the various dipoles mentioned in the other embodiments mentioned herein. The dipole shown in FIG. 17 was formed by first manufacturing a single permanent magnet dipole. The dipole was then cut in a direction perpendicular to its internal magnetic field lines. Next, the two sections were rotated relative to each other until the greatest degree of magnetic field uniformity was achieved. The two sections were then permanently installed as part of shaft 100 in the optimum orientation relative to each other. The increased uniformity of the dipole magnetic field tends to reduce the energy dissipation which would occur upon rotation of the shaft 100.

Figure 20:
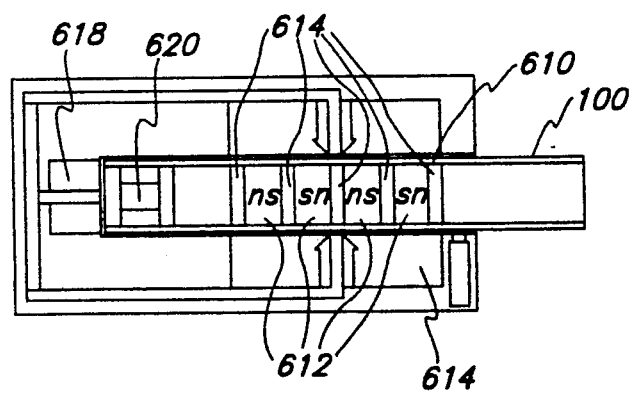
FIG. 20 is a cross sectional view of another embodiment similar to the thrust and journal bearing of FIG. 19.
Figure 19:
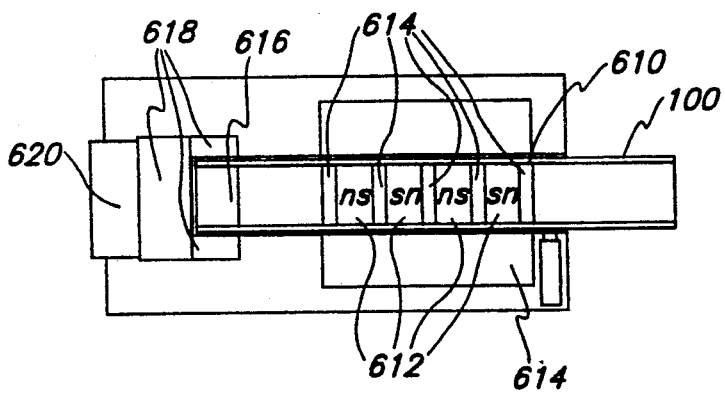
FIG. 19 is a cross-sectional view of a thrust and journal bearing.

Shown in FIGS 19, 20 and 21 are three embodiments of combination thrust and journal bearings which employ the present invention. FIG. 19 depicts a shaft 100 onto which is mounted an octopole 610. Mounted on shaft 100 between each of the four longitudinally oriented dipoles 612 of the octopole 610 and on the outside of the front and rear dipole 612 are bodies of superconductor 614. Mounted on the stationary housing surrounding the bearing is a superconductor ring 614. The bodies of superconductor 614 mounted on shaft 100 causes the magnetic field lines to extend radially outward toward superconductor ring 614. Superconductor ring 614 acts to r ⓡpel the magnetic field lines leaving the dipoles 612. This produces high rigidity and serves to effectively center shaft 100 in the radial direction.

The thrust bearing portion of the structure is located near the end of shaft 100. At the end of shaft 100 is mounted a permanent magnetic dipole 616. It is noted that, although a single monolithic dipole is shown, the efficacy of dipole 616 can be improved by twinning, as described above. Mounted on the bearing housing so as to surround dipole 616 on all but the shaft side are superconductor bodies 618. Superconductor bodies 618 serve functions similar to those carried out by superconductor ring 614. To enhance the efficacy of superconductor bodies 618 another dipole 620 is provided near the outside surface of superconductor bodies 618 which serves to push toward shaft 100 magnetic field lines generated by dipole 616 which pass through superconductor bodies 618.

A similar embodiment to that shown in FIG. 19 is shown in FIG. 20. In contrast with the earlier configuration, FIG. 20 features a quadrupole 620 mounted on the end of shaft 100 and serving as a thrust bearing member. The configuration of FIG. 20 also omits the second dipole 620 outside the stationary thrust superconductor 618.

An embodiment related to that shown in FIG. 20 is shown in FIG. 21 Here, an additional journal bearing similar to that shown in FIG. 17 has been added for added radial stability.

Figure 23:
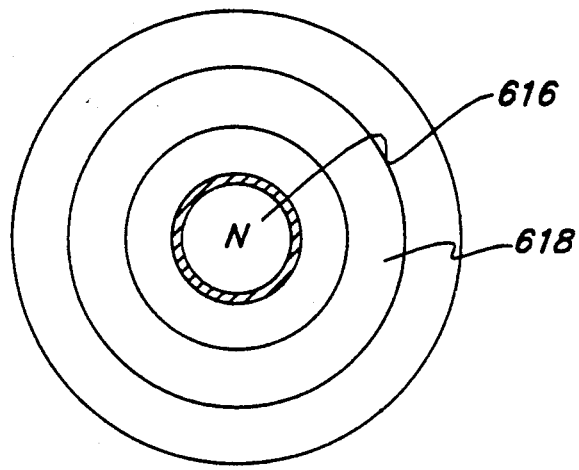
FIG. 23 is an expanded end view of the thrust bearing portion shown in FIG. 22.
Figure 22:
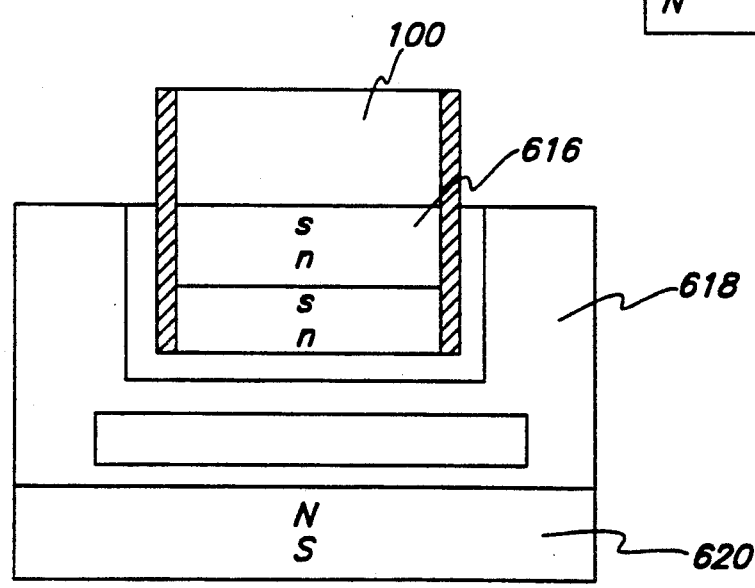
FIG. 22 is an expanded cross sectional view of the thrust bearing portion similar to that shown in FIG. 19.

Shown in FIGS. 22 and 23 are two close-up views of a possible alternative embodiment of a thrust bearing similar to that depicted in FIG. 19. Here the permanent magnet 616 mounted on the end of shaft 100 is clearly shown to have been twinned. Also shown is a stationary dipole 620 mounted outside stationary thrust superconductor 618 in order to press the magnetic field lines toward shaft 100 thereby increasing the thrust bearing stiffness.

Figure 24:
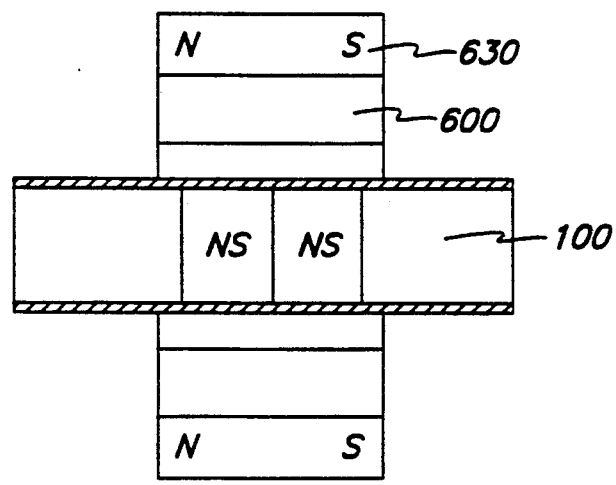
FIG. 24 is an expanded cross sectional view of the journal bearing portion similar to that shown in FIG.

Similarly, shown in FIG. 24 is a close-up view of a possible alternative embodiment of a journal bearing similar to that depicted in FIGS. 17 and 21. A stationary permanent magnet ring 630 is shown mounted outside stationary journal superconductor ring 600 in order to press the magnetic field lines toward shaft 100 thereby increasing the journal bearing stiffness.

Figure 25:
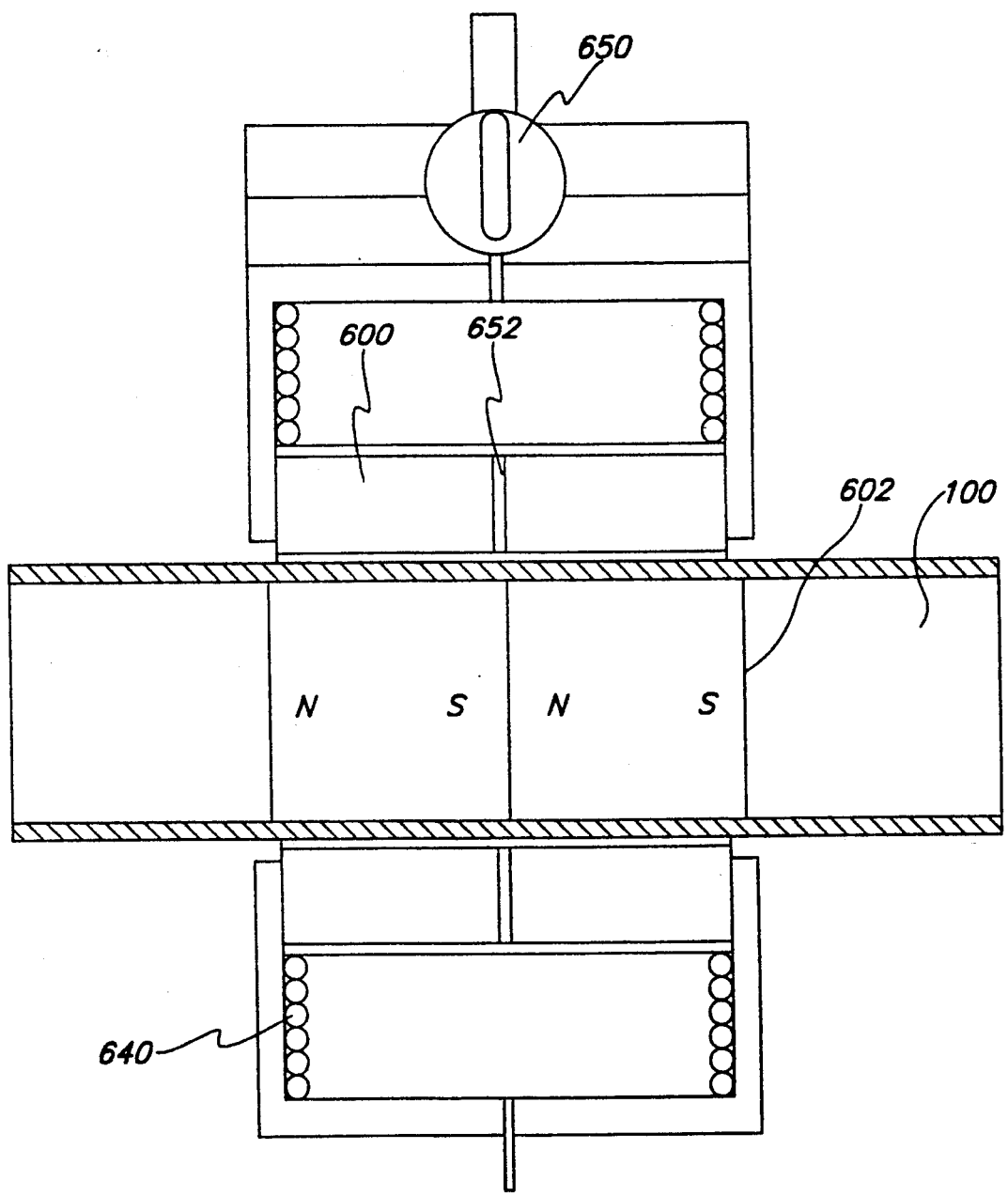
FIG. 25 is a cross-sectional view of a pressurized tilting pad bearing.

In yet another embodiment of the present invention a modified journal bearing similar to that shown in FIGS. 17, 21 and 24 is depicted in FIG. 25. The journal bearing is modified in two ways over the previous embodiments. First, superconductor ring 600 is no longer rigidly mounted on the housing. Rather, superconductor ring 600 is flexibly mounted using, for example springs 640. The additional flexibility allows the ring to move slightly to accommodate large movements of shaft 100, such as might be encountered during startup and shutdown of the system, or during system upsets.

In addition, the system of FIG. 25 also features an auxiliary air bearing system which can serve as backup for the magnetic bearing when forces beyond those which the magnetic bearing system can generate are encountered. Air is fed to shaft 100 through gas inlet 650 and reaches shaft 100 through slits 652 in superconductor ring 600.

Figure 26:
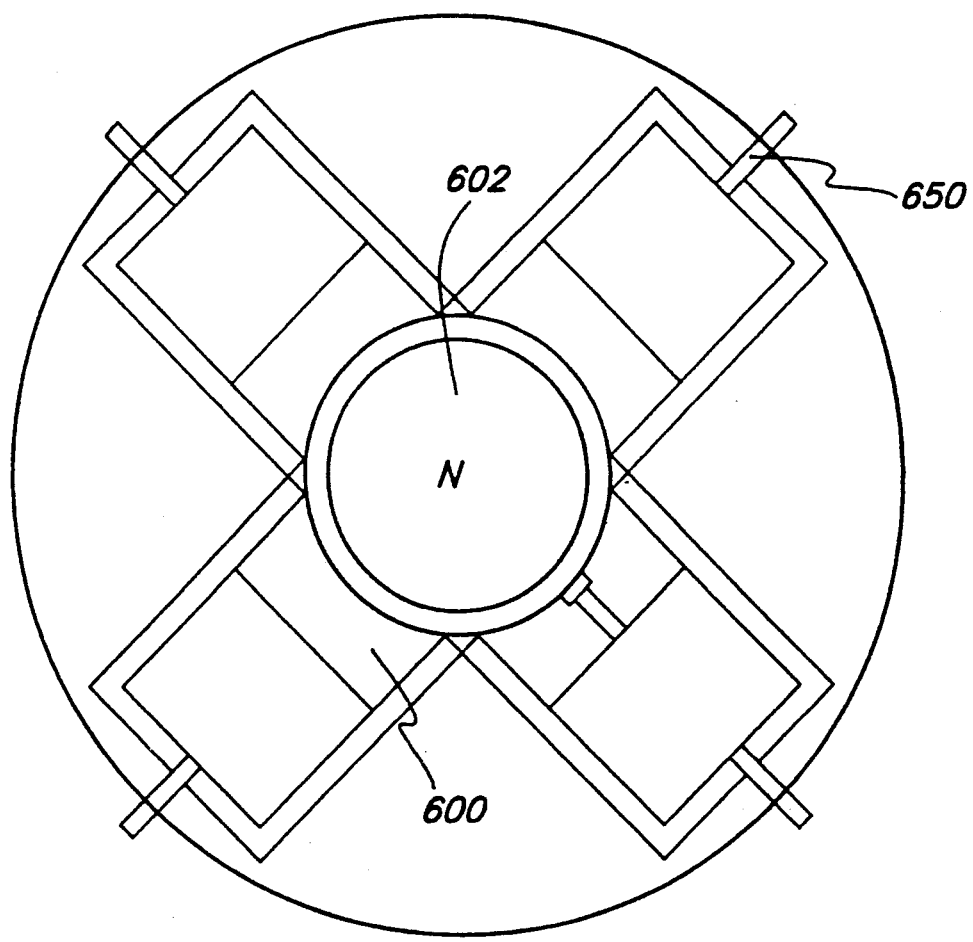
FIG. 26 is an end view of one possible embodiment of the tilting pad bearing of FIG. 25.

Superconductor ring 600 need not necessarily be in the shape of a ring. Any convenient, preferably symmetrical, configuration may be used. One example of a suitable configuration is shown in FIG. 26 which shows four superconductor sections effectively surrounding shaft 100.

Although the present invention has been disclosed in connection with a number of specific embodiments, it is believed that many different additional geometrical configurations may be used without departing from the spirit of the present invention. Additional configurations can be obtained by rearranging the shape, size, thickness, and the like, of the various structural members. Furthermore, many combinations of the various features of the present invention may be made without the exercise of invention in the light of the present teachings.

It is seen that the present invention and the embodiments disclosed herein are well adapted to carry out the objectives and obtain the ends set forth at the outset. Certain changes can be made in the method without departing from the spirit and the scope of this invention. It is realized that changes are possible and it is further intended that each element recited in any of the following claims is to be understood as referring to all equivalent elements for accomplishing substantially the same results in substantially the same or equivalent manner. It is intended to cover the invention broadly in whatever form its principles may be utilized. The present invention is, therefore, well adapted to carry out the objects and obtain the ends and advantages mentioned, as well as others inherent therein.

Those skilled in the art may find many variations and adaptations thereof, and all such variations and adaptations, falling within the true scope and spirit of applicant's invention, are intended to be covered thereby.

What is claimed is:

1. A bearing structure, comprising:
   (a) a rotatable member rotatable about an axis and having a first surface, a second surface and a center;
   (b) a superconductor body attached to said rotatable member;
   (c) a first magnetic quadrupole mounted adjacent said first surface of said rotatable member, said first magnetic quadrupole having a first quadrupole magnetic field oriented parallel to said axis; and
   (d) a second magnetic quadrupole mounted adjacent said second surface of said rotatable member, said second magnetic quadrupole having a second quadrupole magnetic field oriented oppositely from said first quadrupole magnetic field.

2. A bearing structure of claim 1 wherein said first magnetic quadrupole is a magnet selected from the group consisting of permanent magnets and electromagnets.

3. A bearing structure of claim 1 wherein said second magnetic quadrupole is a magnet selected form the group consisting of permanent magnets and electromagnets.

4. A bearing structure of claim 1 further comprising a second superconductor body attached to said rotatable member near the center of said rotatable member.

5. A bearing structure of claim 1 wherein said superconductor body includes layers of superconducting material and non-superconducting materials.

6. A bearing structure of claim 5 wherein said layers are contoured to approximate the magnetic fields of said magnetic quadrupole.

7. A bearing structure, comprising:
(a) a rotatable member rotatable about an axis and having a first surface and a second surface;
(b) a rotatable magnetic quadrupole attached to said rotatable member and having a magnetic field oriented parallel to said axis; and
(c) a superconductor body mounted adjacent said first and second surfaces of said rotatable member.

8. A bearing structure of claim 7 wherein said rotatable magnetic quadrupole is a magnet selected from the group consisting of permanent magnets and electromagnets.

9. A bearing structure of claim 7 wherein said rotatable magnetic quadrupole has a quadrupole magnetic field oriented perpendicular to said axis.

10. A bearing structure of claim 7 wherein said superconductor body is contoured to approximate a magnetic field formed by said rotatable magnetic quadrupole.

11. A bearing structure of claim 7 further comprising a first stationary magnetic quadrupole located adjacent the portion of said superconductor body which is adjacent said first surface of said rotatable member and having a first stationary quadrupole magnetic field oriented oppositely from the magnetic field generated by said rotatable magnetic quadrupole, and a second stationary magnetic quadrupole located adjacent the portion of said superconductor body which is adjacent said second surface of said rotatable member and having a second stationary quadrupole magnetic field oriented oppositely from the magnetic field generated by said rotatable magnetic quadrupole.

12. A bearing structure of claim 11 further comprising a third stationary magnetic quadrupole located to the outside of said rotatable member and having a third stationary quadrupole magnetic field oriented the same as the magnetic field generated by said rotatable magnetic quadrupole.

13. A bearing structure of claim 7 wherein said superconductor body includes layers of superconducting material and non-superconducting materials.

14. A bearing structure comprising:
(a) a sliding member slidable along a linear path and having a first surface, a second surface and a center;
(b) a superconductor body attached to said sliding member;
(c) a first magnetic quadrupolemounted adjacent said first magnetic quadrupole having a first quadrupolemagnetic field oriented perpendicular to said linear path; and,
(d) a second magnetic quadrupole mounted adjacent said second surface of said sliding member, said second magnetic quadrupole having a second quadrupole magnetic field oriented oppositely from said first quadrupole magnetic field.

15. A bearing structure of claim 14 wherein said first magnetic quadrupole is a magnet selected from the group consisting of permanent magnets and electromagnets.

16. A bearing structure of claim 14 wherein said second magnetic quadrupole is a magnet selected from the group consisting of permanent magnets and electromagnets.

17. A bearing structure of claim 14 further comprising a second superconductor body attached to said sliding member near the center of said sliding member.

18. A bearing structure of claim 14 wherein said superconductor body includes layers of superconducting material and non-superconducting materials.

19. A bearing structure of claim 18 wherein said layers are contoured to approximate the magnetic fields of said magnetic quadrupole.

20. A bearing structure comprising:
(a) a sliding member slidable along a linear path and having a first surface, a second surface and an outside;
(b) a sliding magnetic quadrupole attached to said sliding member; and
(c) a superconductor bodymounted adjacent said first and second surfaces of said sliding member.

21. A bearing structure of claim 20 wherein said sliding magnetic quadrupole is a magnet selected from the group consisting of permanent magnets and electromagnets.

22. A bearing structure of claim 20 wherein said superconductor body is contoured to approximate a magnetic field formed by said sliding magnetic quadrupole.

23. A bearing structure of claim 20 further comprising a second superconductor body positioned adjacent to and to the outside of said sliding member.

24. A bearing structure of claim 20 wherein said superconductor body includes layers of superconducting material and non-superconducting materials.

25. A bearing structure of claim 24 wherein said layers are contoured to approximate the magnetic fields of said magnetic quadrupole.

26. A journal baring structure, comprising:
(a) a rotatable member rotatable about an axis;
(b) a magnetic quadrupole attached to said rotatable member with poles oriented along said axis; and
(c) a superconductor body mounted adjacent said magnetic quadrupole and rotatable member.

27. A journal bearing structure of claim 26 wherein said superconductor body includes layers of superconducting material and non-superconducting materials said layers being oriented in the direction of said axis.

28. A journal bearing structure of claim 26 wherein said dipole is twinned.

29. A journal bearing structure of claim 26 further comprising a permanent magnet mounted outside said superconductor body.

30. A journal bearing structure of claim 26 wherein said superconductor body is distributed symmetrically about said axis.

31. A journal bearing structure of claim 26 further comprising tilting means connected to said superconductor body to allow said superconductor body to move relative to said axis.

32. A journal bearing structure of claim 26 wherein said magnetic dipole is a plurality of single magnetic dipoles.

33. A journal bearing structure of claim 32 further comprising a plurality of superconductor bodies separating said plurality of single magnetic dipoles.

34. A thrust bearing structure, comprising:
(a) a rotatable member rotatable about an axis;
(b) a magnetic quadrupole attached to an end of said rotatable member with magnetic pole oriented along said axis; and
(c) a superconductor body mounted adjacent said magnetic pole and rotatable member.

35. A thrust bearing structure of claim 34 wherein said superconductor body includes layers of superconducting material and non-superconducting materials.

36. A thrust bearing structure of claim 34 wherein said magnetic element is a magnetic dipole.

37. A thrust bearing structure of claim 36 wherein said magnetic element is a magnetic quadrupole.

38. A thrust bearing structure of claim 36 wherein said dipole is twinned.

39. A thrust bearing structure of claim 34 wherein said superconductor body is mounted axially from said magnetic element.

40. A thrust bearing structure of claim 34 wherein said superconductor body is mounted to surround said magnetic element radially.

41. A thrust bearing structure of claim 34 further comprising a permanent magnet mounted outside said superconductor body.

42. A thrust and journal bearing structure, comprising:
(a) a rotatable member rotatable about an axis;
(b) a journal magnetic dipole attached to said rotatable member with poles oriented along said axis;
(c) a journal superconductor body mounted adjacent said journal magnetic dipole and said rotatable member;
(d) a thrust magnetic element attached to an end of said rotatable member with poles oriented along said axis; and
(e) a thrust superconductor body mounted adjacent said magnetic dipole and said rotatable member.

43. A thrust and journal bearing structure of claim 42 wherein said journal superconductor body includes layers of superconducting material and non-superconducting materials said layers being oriented in the direction of said axis.

44. A thrust and journal bearing structure of claim 42 wherein said journal dipole is twinned.

45. A thrust and journal bearing structure of claim 42 further comprising a journal permanent magnet mounted outside said journal superconductor body.

46. A thrust and journal bearing structure of claim 42 wherein said journal superconductor body is distributed symmetrically about said axis.

47. A thrust and journal bearing structure of claim 43 further comprising tilting means connected to said journal superconductor body to allow said superconductor body to move relative to said axis.

48. A thrust and journal bearing structure of claim 42 further comprising a journal permanent magnet mounted outside said journal superconductor body.

49. A thrust and journal bearing structure of claim 48 further comprising a plurality of journal superconductor bodies separating said plurality of single journal magnetic dipoles.

50. A thrust and journal bearing structure of claim 42 wherein sid thrust superconductor body includes layers of superconducting material and non-superconducting materials.

51. A thrust and journal bearing structure of claim 42 wherein said thrust magnetic element is a magnetic dipole.

52. A thrust and journal bearing structure of claim 42 wherein said thrust magnetic element is a magnetic quadrupole.

53. A thrust and journal bearing structure of claim 42 wherein said thrust dipole is twinned.

54. A thrust and journal bearing structure of claim 42 wherein sid thrust superconductor body is mounted axially from sid thrust magnetic element.

55. A thrust and journal bearing structure of claim 42 wherein sid thrust superconductor body is mounted to surround said thrust magnetic element radially.

56. A thrust and journal bearing structure of claim 42 further comprising a thrust permanent magnet mounted outside sid thrust superconductor body.

* * * * *